United States Patent
Oteri et al.

(10) Patent No.: US 12,262,414 B2
(45) Date of Patent: Mar. 25, 2025

(54) BEAMFORMING FAILURE DETECTION AND RECOVERY IN HIGH MMWAVE SYSTEMS

(71) Applicant: Apple Inc., Cupertino, CA (US)

(72) Inventors: Oghenekome Oteri, San Diego, CA (US); Yushu Zhang, Beijing (CN); Huaning Niu, San Jose, CA (US); Weidong Yang, San Diego, CA (US); Sigen Ye, Whitehouse Station, NJ (US); Haitong Sun, Cupertino, CA (US); Chunxuan Ye, San Diego, CA (US); Chunhai Yao, Beijing (CN); Hong He, San Jose, CA (US); Wei Zeng, Saratoga, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,267

(22) PCT Filed: Oct. 16, 2020

(86) PCT No.: PCT/CN2020/121485
§ 371 (c)(1),
(2) Date: Sep. 20, 2021

(87) PCT Pub. No.: WO2022/077437
PCT Pub. Date: Apr. 21, 2022

(65) Prior Publication Data
US 2023/0239924 A1 Jul. 27, 2023

(51) Int. Cl.
*H04W 74/08* (2024.01)
*H04L 5/00* (2006.01)
(Continued)

(52) U.S. Cl.
CPC ....... *H04W 74/0816* (2013.01); *H04L 5/0051* (2013.01); *H04W 74/04* (2013.01); *H04W 76/19* (2018.02)

(58) Field of Classification Search
None
See application file for complete search history.

(56) References Cited

U.S. PATENT DOCUMENTS

| 11,057,780 B2 | 7/2021 | Tsai et al. |
| 2019/0268790 A1 | 8/2019 | Kwon et al. |

(Continued)

FOREIGN PATENT DOCUMENTS

| CN | 110831201 A | 2/2020 |
| CN | 111615854 A | 9/2020 |

(Continued)

OTHER PUBLICATIONS

Communication pursuant to Rule 164(1) EPC directed to related European Application No. 20957215.5, mailed Jun. 11, 2024; 14 pages.

(Continued)

*Primary Examiner* — Eunsook Choi
(74) *Attorney, Agent, or Firm* — Sterne, Kessler, Goldstein & Fox P.L.L.C.

(57) ABSTRACT

Beam determination refers to a set of procedures for an access node (AN) and a user equipment (UE) to select from among downlink communication beams and/or uplink communication beams for downlink and/or uplink communications, respectively. Often times, the downlink communication beams can include one or more downlink control channels, for example, a Physical Downlink Control Channel (PDCCH) and/or a Physical Downlink Shared Channel (PDSCH), to provide downlink reference signals, such as channel-state information reference signals (CSI-RSs), to (Continued)

the UE. The AN can execute various exemplary downlink beam scheduling procedures to control the transmission of the downlink reference signals, such as the CSI-RSs to provide an example, over the downlink communication beams. In some embodiments, the UE can utilize the CSI-RSs to perform beamforming failure detection (BFD) and beamforming failure recovery (BFR) in the wireless networks.

20 Claims, 8 Drawing Sheets

(51) Int. Cl.
*H04W 74/04* (2009.01)
*H04W 74/0816* (2024.01)
*H04W 76/19* (2018.01)

(56) References Cited

U.S. PATENT DOCUMENTS

| | | | |
|---|---|---|---|
| 2020/0052865 A1 | 2/2020 | Liou et al. | |
| 2020/0145972 A1 | 5/2020 | Kwak et al. | |
| 2020/0146063 A1 | 5/2020 | Xu et al. | |
| 2020/0328796 A1 | 10/2020 | Turtinen et al. | |
| 2021/0136821 A1* | 5/2021 | Tang | H04W 74/0808 |
| 2022/0124807 A1* | 4/2022 | Hu | H04W 74/006 |
| 2022/0286984 A1* | 9/2022 | Jung | H04W 56/001 |
| 2023/0141702 A1* | 5/2023 | Ganesan | H04L 5/0053 370/329 |
| 2023/0309142 A1* | 9/2023 | Tooher | H04W 74/0808 |

FOREIGN PATENT DOCUMENTS

| | | |
|---|---|---|
| CN | 111630789 A | 9/2020 |
| WO | WO 2019/217880 A1 | 11/2019 |
| WO | WO 2020/033406 A2 | 2/2020 |
| WO | WO 2020033658 A1 | 2/2020 |

OTHER PUBLICATIONS

ITRI, "Discussion on channel access mechanism," 3GPP TSG RAN WGI #101, e-Meeting, May 25-Jun. 5, 2020, R1-2004341; 3 pages.
International Search Report and Written Opinion of the International Searching Authority directed to related International Patent Application No. PCT/CN2020/121485, mailed Jul. 14, 2021; 8 pages.
LG Electronics Inc, "Problems of BFD-inspired Detection Mechanism for Consistent UL LBT Failures," 3GPP TSG-RAN WG2 Meeting #107bis, R2-1913130, Oct. 18, 2019; Retrieved Sep. 16, 2021; 3 pages.
Office Action and Search Report directed to related Chinese Application No. 202080106102.5, with machine translation attached, mailed Jul. 25, 2024; 14 pages.

* cited by examiner

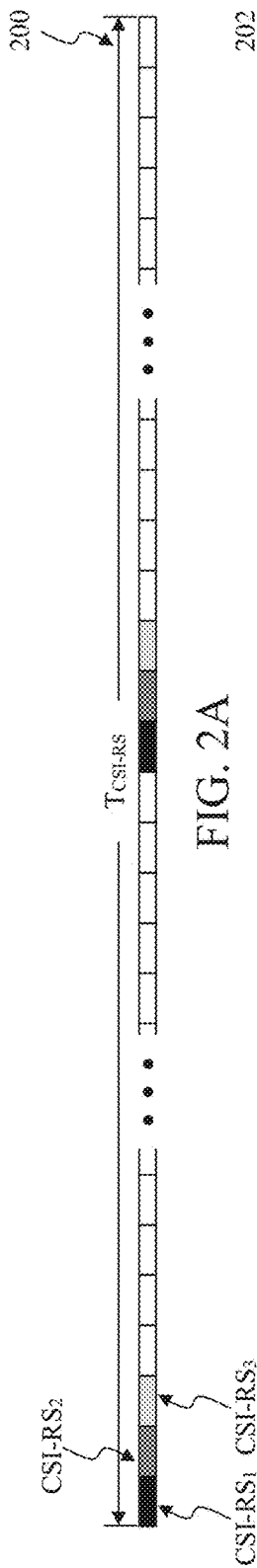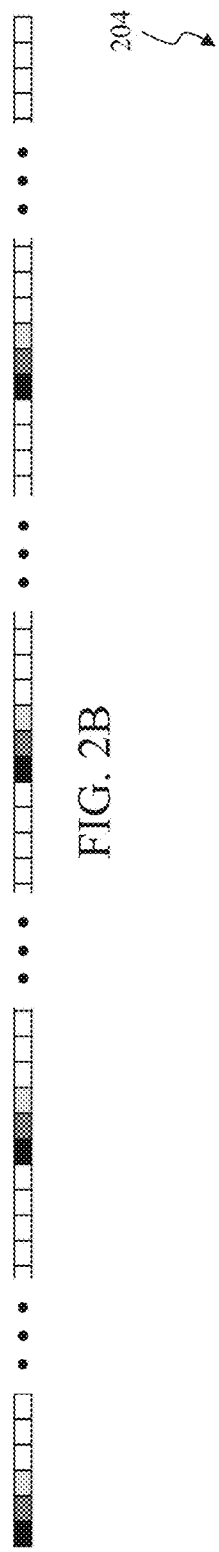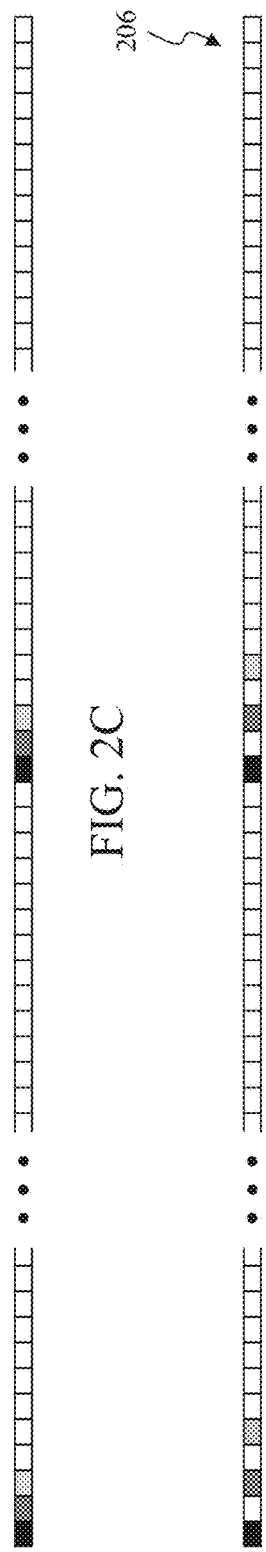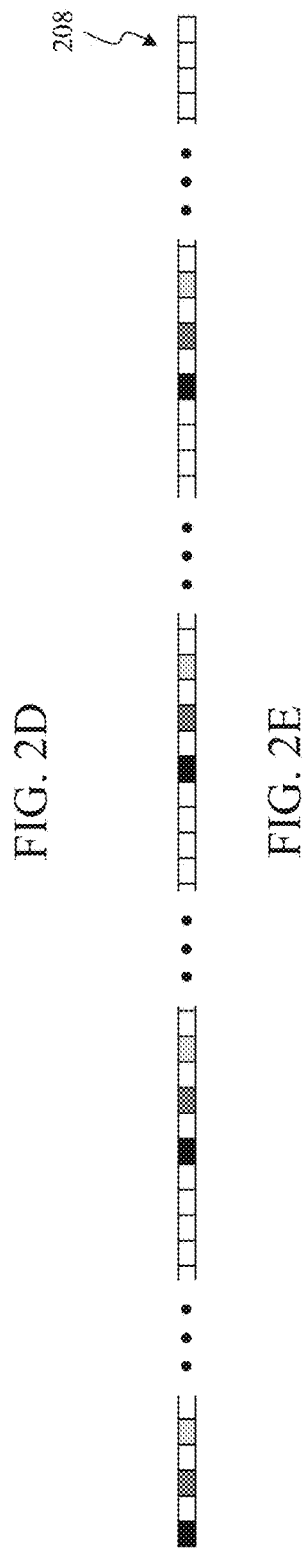
FIG. 2A  FIG. 2B  FIG. 2C  FIG. 2D  FIG. 2E

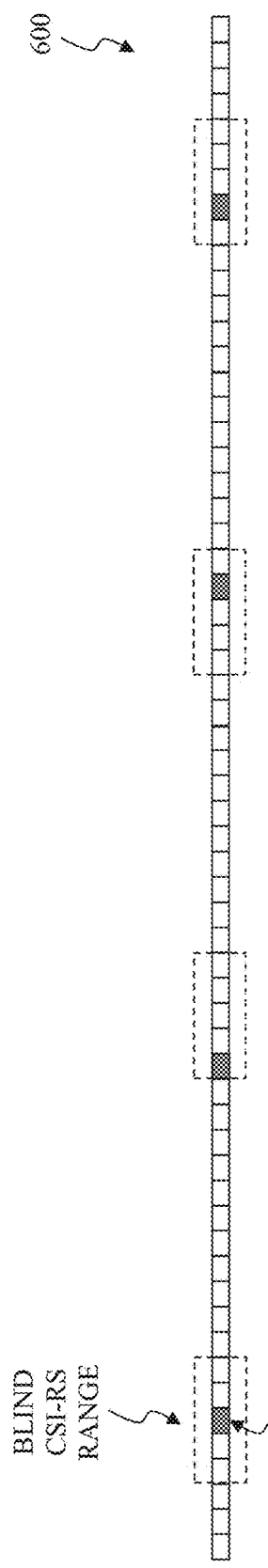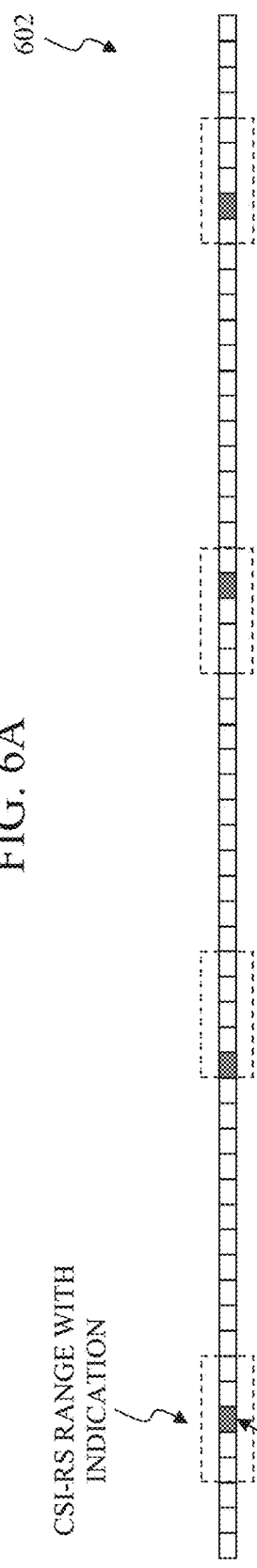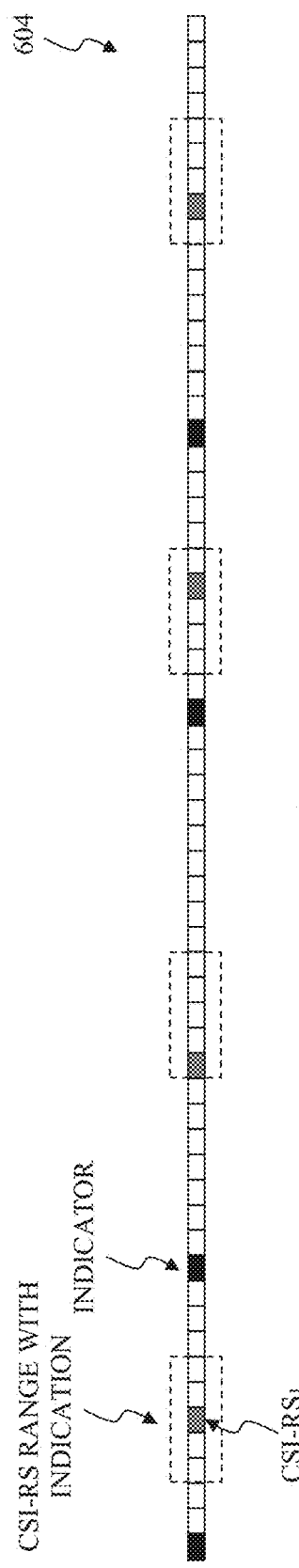
FIG. 6A
FIG. 6B
FIG. 6C

BEAMFORMING FAILURE DETECTION AND RECOVERY IN HIGH MMWAVE SYSTEMS

CROSS REFERENCE TO RELATED APPLICATIONS

The present application is a United States National Phase of International Application No. PCT/CN2020/121485, filed on Oct. 16, 2020, which is incorporated herein by reference in its entirety.

TECHNICAL FIELD

The described embodiments generally relate to beam scheduling procedures in wireless networks, including utilization of the beam scheduling procedures for beamforming failure detection (BFD) and beamforming failure recovery (BFR) in the wireless networks.

BACKGROUND 5G is the fifth-generation wireless technology which has standardized the usage of multiple-input and multiple-output (MIMO) networks, in particular massive MIMO networks, for wireless networks. MIMO and massive MIMO networks use multiple communication beams to exploit multipath propagation to multiply the capacity of these beams. Communication devices within MIMO networks typically include two, four, or eight antennas while communication devices within massive MIMO networks typically include a larger number of antennas, for example, tens or even hundreds of antennas. In these MIMO and massive MIMO networks, access nodes (ANs) and User Equipment (UEs) often maintain multiple communication beams. Beam determination refers to a set of procedures for an AN and a UE to select from among these multiple communication beams for downlink and/or uplink communications, respectively. In some situations, one or more of these multiple communication beams can become unreliable and/or fail. The UE can perform a beamforming failure detection (BFD) procedure to detect which communication beam from among these multiple communication beams has become unreliable and/or failed, and can also perform a beamforming failure recovery (BFR) procedure to determine a new communication beam from among these multiple communication beams for this unreliable and/or failing communication beam.

SUMMARY

Some embodiments of this disclosure describe an access node (AN) for scheduling transmission of multiple reference signals over multiple downlink communication beams. The AN can include a physical layer (PHY) circuitry and a processor. The PHY circuitry can wirelessly communicate with a user equipment (UE). The processor can schedule multiple transmissions of the multiple reference signals over the multiple downlink communication beams, perform a Listen before talk (LBT) procedure to monitor a portion of a spectrum, the LBT procedure identifying a first channel occupancy time (COT) and a second COT where the portion of the spectrum is free from other transmissions and generating an indication of a LBT Failure where the portion of the spectrum is occupied by one or more other transmissions, transmit, using the PHY circuitry, a first transmission from among the multiple transmissions over the multiple downlink communication beams during the first COT, ignore a second transmission from among the multiple transmissions that is scheduled to be transmitted during the LBT Failure, and transmit, using the PHY circuitry, a third transmission from among the multiple transmissions over the multiple downlink communication beams during the second COT.

In some embodiments, the multiple reference signals can include multiple channel-state information reference signals (CSI-RSs).

In some embodiments, the processor can cause the PHY circuitry to transmit a first transmission of the multiple CSI-RSs or of the multiple CSI-RSs concurrently with multiple Physical Downlink Control Channels (PDCCHs) or multiple Physical Downlink Shared Channels (PDSCHs), cause the PHY circuitry to ignore a second transmission of the multiple CSI-RSs that is scheduled to be transmitted during the LBT Failure, and cause the PHY circuitry to transmit a third transmission of the multiple CSI-RSs or of the multiple CSI-RSs concurrently with the multiple PDCCHs or the multiple PDSCHs.

In some embodiments, the spectrum can include an unlicensed spectrum having a frequency range above 52.6 Gigahertz (GHz).

In some embodiments, the processor can cause the PHY circuitry to transmit the third transmission of the multiple reference signals over the multiple downlink communication beams starting with an instance of a first reference signal from among the multiple reference signals that is scheduled to be transmitted during the second COT.

In some embodiments, the processor can cause the PHY circuitry to transmit the third transmission of the multiple reference signals over the multiple downlink communication beams starting with an instance of the multiple reference signals from among the multiple reference signals that is scheduled to be transmitted during the second COT.

In some embodiments, the processor can cause the PHY circuitry to transmit the third transmission of the multiple reference signals over the multiple downlink communication beams starting from a beginning of the second COT.

Some embodiments of this disclosure describe a method for scheduling transmission. The method can include scheduling multiple transmissions of multiple reference signals over multiple downlink communication beams; performing a Listen before talk (LBT) procedure to monitor a portion of a spectrum, the LBT procedure identifying a first channel occupancy time (COT) and a second COT where the portion of the spectrum is free from other transmissions and generating an indication of a LBT Failure where the portion of the spectrum is occupied by one or more other transmissions; transmitting a first transmission from among the multiple transmissions over the multiple downlink communication beams during the first COT; ignoring a second transmission from among the multiple transmissions that is scheduled to be transmitted during the LBT Failure; and transmitting a third transmission from among the multiple transmissions over the multiple downlink communication beams during the second COT.

In some embodiments, the multiple reference signals can include multiple channel-state information reference signals (CSI-RSs).

In some embodiments, the transmitting the first transmission, the ignoring the second transmission, and the transmitting the third transmission can include transmitting a first transmission of the multiple CSI-RSs or of the multiple CSI-RSs concurrently with multiple Physical Downlink Control Channels (PDCCHs) or multiple Physical Downlink Shared Channels (PDSCHs); ignoring a second transmission of the multiple CSI-RSs from among the multiple transmissions of the multiple CSI-RSs that is scheduled to be transmitted during the LBT Failure; and transmitting a third transmission of the multiple CSI-RSs or of the multiple CSI-RSs concurrently with the multiple PDCCHs or the multiple PDSCHs.

In some embodiments, the spectrum can include an unlicensed spectrum having a frequency range above 52.6 Gigahertz (GHz).

In some embodiments, the transmitting the third transmission can include transmitting the third transmission of the multiple reference signals over the multiple downlink communication beams starting with an instance of a first reference signal from among the multiple reference signals that is scheduled to be transmitted during the second COT.

In some embodiments, the transmitting the third transmission can include transmitting the third transmission of the multiple reference signals over the multiple downlink communication beams starting with an instance of the multiple reference signals from among the multiple reference signals that is scheduled to be transmitted during the second COT.

In some embodiments, the transmitting the third transmission can include transmitting the third transmission of the multiple reference signals over the multiple downlink communication beams starting from a beginning of the second COT.

Some embodiments of this disclosure describe a method for performing a beam failure detection (BFD) procedure. The method can include monitoring a block error rate (BLER) of a reference signal within a downlink communication beam during a BFD window to determine whether the downlink communication beam satisfies a failure indication; incrementing a count of a beam failure indication counter when the block error rate (BLER) satisfies a predetermined physical downlink control channel (PDCCH) BLER target; decrementing the count of the beam failure indication counter in response to an access node (AN) not being scheduled to transmit the reference signal within the downlink communication beam; and identifying the downlink communication beam as failing when the count of the beam failure counter satisfies a predetermined number of beam failure indications during the BFD window.

In some embodiments, the reference signal can include a channel-state information reference signal (CSI-RS).

In some embodiments, the monitoring can include generating, a beam failure indication (BFI) when the block error rate (BLER) satisfies a predetermined PDCCH BLER target.

In some embodiments, the predetermined PDCCH BLER target can include a percentage of a predetermined PDCCH BLER of a predetermined PDCCH transmission.

In some embodiments, the decrementing can include receiving, by the UE from the AN, one or more channel occupancy time (COT) indicators indicating when the AN is scheduled to transmit the reference signal.

In some embodiments, the method can further include beginning, by the UE, a beam failure recovery (BFR) procedure in response to identifying the downlink communication beam as failing.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

FIG. 2A through FIG. 2E graphically illustrate exemplary downlink beam scheduling procedures that can be utilized by the exemplary wireless network for licensed operation in accordance with various embodiments.

FIG. 6A through FIG. 6C graphically illustrate yet further exemplary downlink beam scheduling procedures that can be utilized by the exemplary wireless network for unlicensed operation in accordance with various embodiments.

Figure 1:
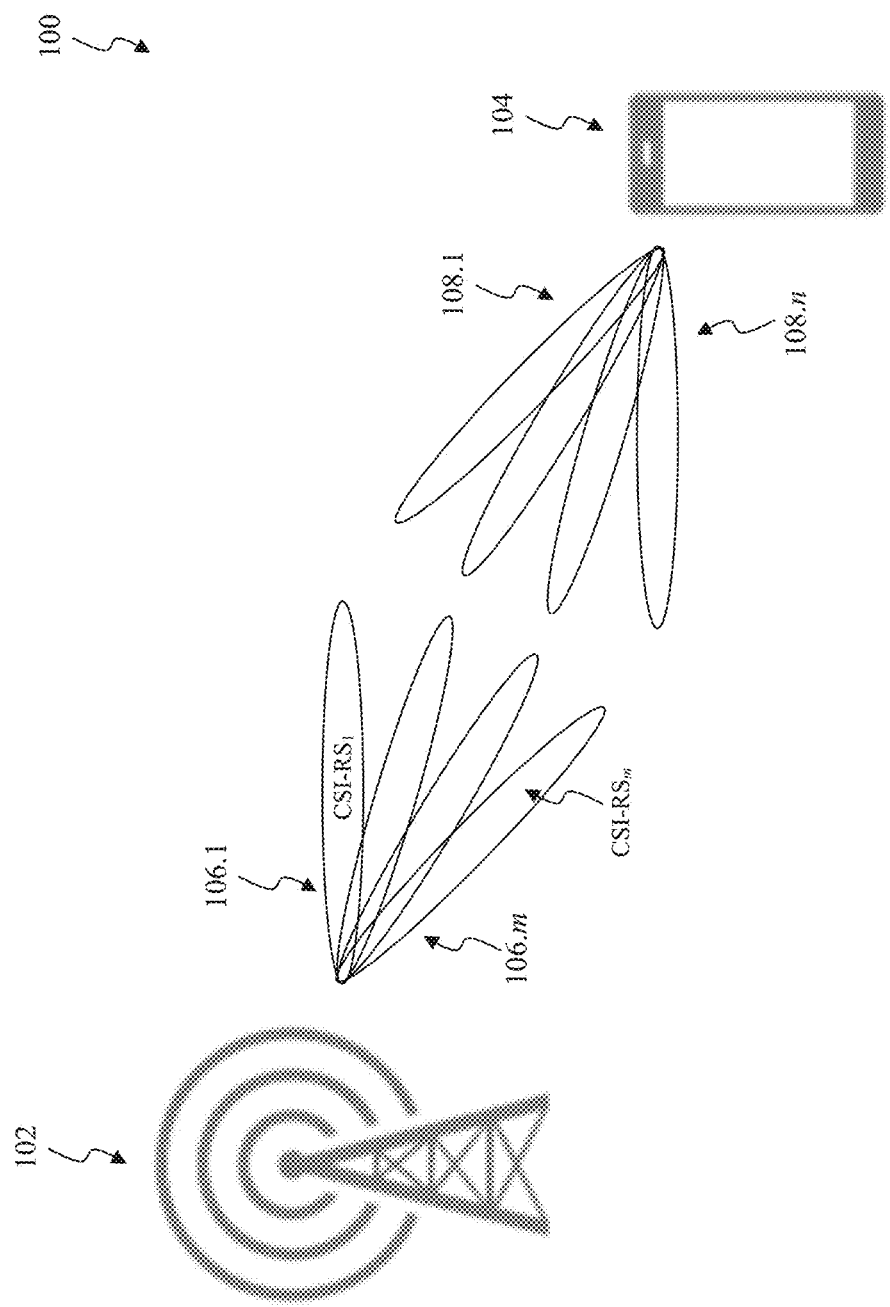
FIG. 1 graphically illustrates an exemplary wireless network in accordance with various embodiments.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Beam determination refers to a set of procedures for an access node (AN) and a user equipment (UE) to select from among downlink communication beams and/or uplink communication beams for downlink and/or uplink communications, respectively. The downlink communication beams can provide downlink reference signals, such as channel-state information reference signals (CSI-RSs), to the UE. In some embodiments, the downlink communication beams can include one or more downlink control channels, for example, a Physical Downlink Control Channel (PDCCH), a Physical Downlink Shared Channel (PDSCH), one or more Synchronization Signal Blocks (SSBs), and/or a Physical Broadcasting Channel (PBCH). In these embodiments, the downlink reference signals can be transmitted concurrently with these downlink control channels or by themselves as stand-alone reference signals. The detailed description to follow describes various exemplary downlink beam scheduling procedures to control the transmission of the downlink reference signals, such as the CSI-RSs to provide an example, over the downlink communication beams. In some embodiments, the UE can utilize the CSI-RSs to perform beamforming failure detection (BFD) and beamforming failure recovery (BFR) in the wireless networks.

Exemplary Wireless Network

FIG. 1 graphically illustrates an exemplary wireless network in accordance with various embodiments. A wireless network 100 as illustrated in FIG. 1 is provided for the purpose of illustration only and does not limit the disclosed embodiments. In the exemplary embodiment illustrated in FIG. 1, the wireless network 100 can include, but are not limited to, an access node (AN) 102 and a user equipment (UE) 104. The UE 104 can include, but are not limited to, a Wireless Local Area Network (WLAN) station such as a wireless communication device, a smart phone, a laptop computing device, a desktop computing device, a tablet computing device, a monitor, a television, a wearable device, and the like. As used herein, the terms "access node," "access point," or the like can describe equipment that provides the radio baseband functions for data and/or voice connectivity between a network and one or more UEs or stations. These access node 102 can be referred to as wireless router, Base Stations (BSs), Next Generation NodeBs (gNBs), Radio Access Network (RAN) nodes, evolved NodeBs (eNBs), NodeBs, Road Side Units (RSUs), Transmission Reception Point (TRxPs or TRPs), and so forth, and can include ground stations, such as terrestrial access points, or satellite stations providing coverage within a geographic area, also referred to a serving cell. As used herein, the term "downlink" refers to the direction from the AN 102 to the UE 104. The term "uplink" refers to the direction from the UE 104 to the AN 102.

Beam determination refers to a set of procedures for the AN 102 and the UE 104 to select from among downlink communication beams 106.1 through 106.$m$ and/or uplink communication beams 108.1 through 108.$n$ for downlink and/or uplink communications. In some embodiments, the downlink communication beams 106.1 through 106.$m$ can provide downlink reference signals, such as channel-state information reference signals (CSI-RSs), to the UE 104. In some embodiments, the downlink communication beams 106.1 through 106.$m$ can include one or more downlink control channels, for example, a Physical Downlink Control Channel (PDCCH), a Physical Downlink Shared Channel (PDSCH), one or more Synchronization Signal Blocks (SSBs), and/or a Physical Broadcasting Channel (PBCH). In these embodiments, the AN 102 can transmit the downlink reference signals concurrently with these downlink control channels or by themselves as stand-alone reference signals. In some embodiments, the AN 102 can perform a downlink beam scheduling procedure to control the transmission of the downlink reference signals, such as the CSI-RSs to provide an example, over the downlink communication beams 106.1 through 106.$m$. As part of this downlink beam scheduling procedure, the AN 102 can selectively control which downlink communication beams from among the downlink communication beams 106.1 through 106.$m$ are to be used to transmit the one or more downlink reference signals to the UE 104.

In the exemplary embodiment illustrated in FIG. 1, the UE 104 can identify the downlink communication beams 106.1 through 106.$m$ that are to be used to by the AN 102 to transmit the downlink reference signals. Once a corresponding reference signal has been recovered by the UE 104 from a downlink communication beam from among the downlink communication beams 106.1 through 106.$m$, the UE 104 can utilize the corresponding reference signal as part of a beamforming failure detection (BFD) procedure to assess a radio link quality of the downlink communication beam. In some embodiments, the UE 104 can monitor the radio link quality of the downlink communication beam and can thereafter provide an indication, referred as a beam failure indication (BFI), when the radio link quality of the downlink communication beam indicates the downlink communication beam is failing. In these embodiments, when the number of BFIs reaches a certain value or threshold, for example, a maximum number of beam failure indications, MBFI, the UE 104 determines that the downlink communication beam has failed.

Once the UE 104 has determined the downlink communication beam has failed, the UE 104 undergoes a beamforming failure recovery (BFR) procedure. As part of this BFR procedure, the UE 104 identifies one or more new candidate downlink communication beams from among the downlink communication beams 106.1 through 106.$m$ from a candidate beam list and thereafter identifies the one or more new candidate downlink communication beams in a beam failure recovery request (BFRQ) provided to the AN 102 over one or more uplink channels, such as a physical random access channel (PRACH) and/or one or more uplink control channels, such as a Physical Uplink Control Channel (PUCCH) and/or a Physical Uplink Shared Channel (PUSCH), to provide some examples. In some embodiments, the BFRQ identifies an identifier of the UE 104 and the one or more new candidate downlink communication beams. Thereafter, the UE 104 monitors downlink control channels, for example, a Physical Downlink Control Channel (PDCCH) and/or a Physical Downlink Shared Channel (PDSCH), corresponding to the one or more new candidate downlink communication beams for a response from the AN 102 to the BFRQ, and can thereafter utilize the one or more new candidate downlink communication beams upon receiving the response from the AN 102.

Exemplary Scheduling Procedures for Licensed Operation

As described above, the AN 102 can perform a downlink beam scheduling procedure to selectively control which downlink communication beams from among the downlink communication beams 106.1 through 106.$m$ are to be used to transmit the channel-state information reference signals (CSI-RSs). In some embodiments, the AN 102 can utilize one or more time-frequency resources to transmit the CSI-RSs over the downlink communication beams 106.1 through 106.$m$ . . . In some embodiments, the one or more time frequency resources can be structured using downlink resource grids, such as a time-frequency grids, also called resource grids or time-frequency resource grids, which are utilized for downlink transmissions between the UE 104 and the AN 102. Each column and each row of these resource grids corresponds to one Orthogonal Frequency Domain Multiplexed (OFDM) symbol and one OFDM subcarrier, respectively. In some embodiments, the configuration of waveform parameters for these OFDM symbols is defined by one or more numerology sets. These waveform parameters define the placement of the CSI-RSs into the downlink resource grid and the structures, for example, pulse shapes and/or filters, that are utilized to map information symbols to these resources. These numerology sets can include pre-defined numbers of subcarriers, subcarrier spacings (SCSs), slot durations, cyclic prefix (CP) durations, and/or maximum bandwidth (BW) allocations to provide some examples. Rel-15 and Rel-16 provide for numerology sets for the range of frequencies between 4.1 GHz to 7.125 GHz, referred to as FR1, which is primarily used for traditional cellular mobile communications traffic, and for the range of frequencies between 24.25 GHz to 52.6 GHz, referred to as FR2, which is primarily used for short-range, high data rate capabilities.

The discussion to follow is to describe exemplary downlink beam scheduling procedures that can be utilized within the range of frequencies between 52.6 GHz and 71 GHz and beyond. The range of frequencies between 52.6 GHz and 71 GHz can include licensed spectrum and unlicensed spectrum. Generally, the licensed spectrum represents portions of the radio spectrum designated by a governing authority, such as the Federal Communication Commission (FCC) to provide an example, to be reserved for one or more organizations that have been granted exclusive rights to utilize these portions of the radio spectrum. In some embodiments, the exemplary downlink beam scheduling procedures as to be described in further detail below in FIG. 2A through FIG. 2E can be utilized to schedule transmission in the licensed spectrum and/or the exemplary downlink beam scheduling procedures as to be described in further detail below in FIG. 3A through FIG. 3C, FIG. 4, FIG. 5, FIG. 6A, FIG. 6B, and FIG. 6C can be utilized to schedule transmission in the unlicensed spectrum. Although, the discussion of FIG. 2A through FIG. 2E to follow is to be described in terms of licensed operation and the discussion of FIG. 3A through FIG. 3C, FIG. 4, FIG. 5, FIG. 6A, FIG. 6B, and FIG. 6C to follow is to be described in terms of unlicensed operation, those skilled in the relevant art(s) will recognize that the exemplary downlink beam scheduling procedures described in these figures can be utilized in the licensed spectrum and the unlicensed spectrum without departing from the spirit and scope of the present disclosure.

FIG. 2A through FIG. 2E graphically illustrate exemplary downlink beam scheduling procedures that can be utilized by the exemplary wireless network for licensed operation in accordance with various embodiments. As described above in FIG. 1, the AN 102 can perform a downlink beam scheduling procedure to selectively control which downlink communication beams from among the downlink communication beams 106.1 through 106.m are to be used to transmit the channel-state information reference signals (CSI-RSs) to the UE 104. In the exemplary embodiments illustrated in FIG. 2A through FIG. 2E, the AN 102 can perform the exemplary downlink beam scheduling procedures to be described in further detail below to periodically and/or aperiodically transmit at least CSI-RS$_1$ through CSI-RS$_3$ over the downlink communication beams 106.1 through 106.3. Throughout FIG. 2A through FIG. 2E, the CSI-RS$_1$ is illustrated using dark shading, the CSI-RS$_2$ is illustrated using medium shading, and the CSI-RS$_3$ is illustrated using light shading. It should be noted that the various exemplary downlink beam scheduling procedures illustrated in FIG. 2A through 2E are not limited to the CSI-RS$_1$ through the CSI-RS$_3$. Those skilled in the relevant art(s) will recognize that these exemplary downlink beam scheduling procedures can be utilized to schedule transmission of any suitable number of CSI-RSs over any suitable number of downlink communication beams from among the downlink communication beams 106.1 through 106.m that will be apparent to those skilled in the relevant art(s) without departing from the spirit and scope of the present disclosure.

FIG. 2A graphically illustrates a first downlink beam scheduling procedure 200 to selectively control transmission of the CSI-RS$_1$ through the CSI-RS$_3$ over the downlink communication beams 106.1 through 106.3. In the exemplary embodiment illustrated in FIG. 2A, the AN 102 can perform the first downlink beam scheduling procedure 200 to selectively control which downlink communication beams from among the downlink communication beams 106.1 through 106.3 are to be used to transmit the CSI-RS$_1$ through the CSI-RS$_3$ to the UE 104. In the exemplary embodiment illustrated in FIG. 2A, the AN 102 can configure the CSI-RSs in accordance with one or more waveform parameters, such as number of subcarriers, subcarrier spacing (SCS), slot duration, cyclic prefix (CP) duration, and/or maximum bandwidth (BW) allocation to provide some examples, that are defined in accordance with a first exemplary numerology set. For example, the CSI-RS$_1$ through the CSI-RS$_3$ as illustrated in FIG. 2A can be characterized as having a SCS of two hundred forty (240) kHz.

As illustrated in FIG. 2A, the AN 102 can perform the first downlink beam scheduling procedure 200 to schedule a periodic transmission and/or an aperiodic transmission of the CSI-RS$_1$ through the CSI-RS3 over the downlink communication beams 106.1 through 106.3 in accordance with a CSI-RS transmission duty cycle, denoted as $T_{CSI-RS}$ in FIG. 2A. In some embodiments, the CSI-RS transmission duty cycle $T_{CSI-RS}$ has a maximum periodicity, without discontinuous reception (DRX), of two (2) milliseconds (ms) which provides thirty-two (32) slots per two (2) ms period and four hundred forty-eight (448) symbols per two (2) ms period for a SCS of two hundred forty (240) kHz. In the exemplary embodiment illustrated in FIG. 2A, the AN can periodically transmit at least two (2) instances, or periods, of the CSI-RS$_1$ through the CSI-RS$_3$ over the downlink communication beams 106.1 through 106.3 while maintaining the maximum periodicity of two (2) ms for the transmission duty cycle $T_{CSI-RS}$. In these exemplary embodiments, the CSI-RS$_1$ through the CSI-RS3 occupy, for each of these periodic transmissions, the first three (3) slots from among the sixteen (16) slots and other CSI-RSs, not illustrated in FIG. 2A, can occupy the remaining slots from among the sixteen (16) slots such that a maximum of sixteen (16) candidate downlink communication beams can be utilized by the UE when performing beamforming failure recovery (BFR) as described above in FIG. 1.

FIG. 2B through FIG. 2E graphically illustrate a second downlink beam scheduling procedure 202 through a fifth downlink beam scheduling procedure 208 to selectively control transmission of the CSI-RS$_1$ through the CSI-RS$_3$ over the downlink communication beams 106.1 through 106.3. In the exemplary embodiment illustrated in FIG. 2B through 2E, the AN 102 can perform the second downlink beam scheduling procedure 202 through the fifth downlink beam scheduling procedure 208 to selectively control which downlink communication beams from among the downlink communication beams 106.1 through 106.3 are to be used to transmit the CSI-RS$_1$ through the CSI-RS$_3$ to the UE 104. In the exemplary embodiment illustrated in FIG. 2B through FIG. 2E, the AN 102 can configure the CSI-RSs in accordance with one or more waveform parameters, such as number of subcarriers, subcarrier spacing (SCS), slot duration, cyclic prefix (CP) duration, and/or maximum bandwidth (BW) allocation to provide some examples, that are defined in accordance with a second exemplary numerology set. For example, the CSI-RS$_1$ through the CSI-RS$_3$ as illustrated in FIG. 2B through FIG. 2E can be characterized as having a SCS of four hundred eighty (480) kHz.

As illustrated in FIG. 2B, the AN 102 can perform the second downlink beam scheduling procedure 202 to schedule a periodic transmission and/or an aperiodic transmission of the CSI-RSi through the CSI-RS3 over the downlink communication beams 106.1 through 106.3 in accordance with the CSI-RS transmission duty cycle $T_{CSI-RS}$ as described above in FIG. 2A. In the exemplary embodiment illustrated in FIG. 2B, the second downlink beam scheduling procedure 202 can schedule the periodicity of the $CSI-RS_1$ through the $CSI-RS_3$ to be less than the periodicity of the $CSI-RS_1$ through the $CSI-RS_3$ as described above in FIG. 2A, while maintaining the same overhead as in FIG. 2A, to accommodate for the greater number of slots for the increased SCS of four hundred eighty (480) kHz as illustrated in FIG. 2B when compared to the SCS of two hundred forty (240) kHz as illustrated in FIG. 2A. In the exemplary embodiment illustrated in FIG. 2B, the second downlink beam scheduling procedure 202 can schedule the periodic and/or the aperiodic transmission of at least four (4) instances, or periods, of the $CSI-RS_1$ through the $CSI-RS3$ over the downlink communication beams 106.1 through 106.3 while maintaining the maximum periodicity of two (2) ms for the transmission duty cycle $T_{CSI-RS}$. In these exemplary embodiments, the second downlink beam scheduling procedure 202 can schedule the $CSI-RS_1$ through the $CSI-RS_3$ to occupy, for each of these periodic transmissions, the first three (3) slots from among the sixteen (16) slots and other CSI-RSs, not illustrated in FIG. 2B, can occupy the remaining slots from among the sixteen (16) slots such that a maximum of sixteen (16) candidate downlink communication beams can be utilized by the UE 104 when performing beamforming failure recovery (BFR) as described above in FIG. 1.

As illustrated in FIG. 2C, the AN 102 can perform the third downlink beam scheduling procedure 204 to schedule a periodic transmission and/or an aperiodic transmission of the CSI-RSi through the $CSI-RS3$ over the downlink communication beams 106.1 through 106.3 in accordance with the CSI-RS transmission duty cycle $T_{CSI-RS}$ as described above in FIG. 2A. In the exemplary embodiment illustrated in FIG. 2C, the third downlink beam scheduling procedure 204 can schedule the periodicity of the $CSI-RS_1$ through the $CSI-RS_3$ to be the same as the periodicity of the $CSI-RS_1$ through the $CSI-RS_3$ as described above in FIG. 2A, while maintaining the same overhead as in FIG. 2A. In the exemplary embodiment illustrated in FIG. 2C, the third downlink beam scheduling procedure 204 can schedule the periodic and/or the aperiodic transmission of at least two (2) instances, or periods, of the $CSI-RS_1$ through the $CSI-RS_3$ over the downlink communication beams 106.1 through 106.3 while maintaining the maximum periodicity of two (2) ms for the transmission duty cycle $T_{CSI-RS}$. In these exemplary embodiments, the third downlink beam scheduling procedure 204 can schedule the $CSI-RS_1$ through the $CSI-RS_3$ to occupy, for each of these periodic transmissions, the first three (3) slots from among the thirty-two (32) and other CSI-RSs, not illustrated in FIG. 2C, can occupy the remaining slots from among the thirty-two (32) such that a maximum of thirty-two (32) candidate downlink communication beams can be utilized by the UE 104 when performing beamforming failure recovery (BFR) as described above in FIG. 1.

As illustrated in FIG. 2D, the AN 102 can perform the fourth downlink beam scheduling procedure 206 to schedule a periodic transmission and/or an aperiodic transmission of the $CSI-RS_1$ through the $CSI-RS_3$ over the downlink communication beams 106.1 through 106.3 in accordance with the CSI-RS transmission duty cycle $T_{CSI-RS}$ as described above in FIG. 2A. In the exemplary embodiment illustrated in FIG. 2D, the fourth downlink beam scheduling procedure 206 can schedule the periodicity of the $CSI-RS_1$ through the $CSI-RS_3$ to be the same as the periodicity of the $CSI-RS_1$ through the $CSI-RS_3$ as described above in FIG. 2A while additional overhead is added to account for limitations in beam switching time i.e. the time needed by the UE to switch from one beam to another in the case that the time exceeds the duration of the cyclic prefix of the symbol and cannot be performed transparently within the cyclic prefix, by providing the UE 104 with extra symbols between the $CSI-RS_1$ through the $CSI-RS_3$ to switch from among the downlink communication beams 106.1 through 106.3. In the exemplary embodiment illustrated in FIG. 2D, the fourth downlink beam scheduling procedure 206 can schedule the periodic and/or the aperiodic transmission of at least two (2) instances, or periods, of the $CSI-RS_1$ through the $CSI-RS_3$ over the downlink communication beams 106.1 through 106.3 while maintaining the maximum periodicity of two (2) ms for the transmission duty cycle $T_{CSI-RS}$. In these exemplary embodiments, the second downlink beam scheduling procedure 202 can schedule the $CSI-RS_1$ through the $CSI-RS_3$ to occupy, for each of these periodic transmissions, the first, the third, and the fifth slots, respectively from among the thirty two (32) slots and other CSI-RSs, not illustrated in FIG. 2D, can similarly occupy the remaining slots with similar overhead from among the thirty two (32) slots such that a maximum of sixteen (16) candidate downlink communication beams can be utilized by the UE when performing beamforming failure recovery (BFR) as described above in FIG. 1. In these exemplary embodiments, even slots, such as the second, the fourth, and the sixth, etc., represent the additional overhead which is introduced by the fourth downlink beam scheduling procedure 206 to account for limitations in beam switching time.

As illustrated in FIG. 2E, the AN 102 can perform the fifth downlink beam scheduling procedure 208 to schedule a periodic transmission and/or an aperiodic transmission of the $CSI-RS_1$ through the $CSI-RS3$ over the downlink communication beams 106.1 through 106.3 in accordance with the CSI-RS transmission duty cycle $T_{CSI-RS}$ as described above in FIG. 2A. In the exemplary embodiment illustrated in FIG. 2E, the fifth downlink beam scheduling procedure 208 can schedule the periodicity of the $CSI-RS_1$ through the $CSI-RS_3$ to be the same as the periodicity of the $CSI-RS_1$ through the $CSI-RS_3$ as described above in FIG. 2A while additional overhead is added to account for limitations in beam switching time by providing the UE 104 with extra symbols between the $CSI-RS_1$ through the $CSI-RS_3$ to switch from among the downlink communication beams 106.1 through 106.3. In the exemplary embodiment illustrated in FIG. 2E, the fifth downlink beam scheduling procedure 208 can schedule the periodic and/or the aperiodic transmission of at least two (2) instances, or periods, of the $CSI-RS_1$ through the $CSI-RS_3$ over the downlink communication beams 106.1 through 106.3 while maintaining the maximum periodicity of two (2) ms for the transmission duty cycle $T_{CSI-RS}$. In these exemplary embodiments, the second downlink beam scheduling procedure 202 can schedule the $CSI-RS_1$ through the $CSI-RS_3$ to occupy, for each of these periodic transmissions, the first, the third, and the fifth slots, respectively from among the thirty sixteen (16) slots and other CSI-RSs, not illustrated in FIG. 2E, can similarly occupy the remaining slots with similar overhead from among the sixteen (16) slots such that a maximum of eight (8) candidate downlink communication beams can be utilized by the UE when performing beamforming failure recovery (BFR) as described above in FIG. 1. In these exemplary embodiments, even slots, such as the second, the fourth, and the sixth, etc., represent the additional overhead which is introduced by the fifth downlink beam scheduling procedure 208 to account for limitations in beam switching time.

Although the first downlink beam scheduling procedure 200 through the fifth downlink beam scheduling procedure 208 have been described as scheduling the transmission of the $CSI-RS_1$ through the $CSI-RS_3$ over the downlink communication beams 106.1 through 106.3, those skilled in the relevant art(s) will recognize that these beam scheduling procedures can alternatively, or additionally, schedule more than one of the $CSI-RS_1$ through the $CSI-RS_3$ to be transmitted over a single downlink communication beam from among the downlink communication beams 106.1 through 106.3 to increase coverage of the AN 102. In some embodiments, the AN 102 can signal a decimation and/or a sampling factor to the UE which indicates which periodic instances of this single CSI-RS are to be used or not used by the UE.

Exemplary Scheduling Procedures for Unlicensed Operation

As discussed above, the range of frequencies between 52.6 GHz and 71 GHz can include licensed spectrum and unlicensed spectrum. Generally, the unlicensed spectrum represents portions of the radio spectrum that are available to general public with a governing authority, such as the Federal Communication Commission (FCC) to provide an example, promulgating rules on their usage. The operation in the unlicensed spectrum can involve adhering to various regulatory rules which facilitate fair and equal usage of the unlicensed spectrum for different devices and radio access technologies. In some embodiments, the AN 102 can perform a Listen before talk (LBT) procedure to monitor a portion, or portions, of the unlicensed spectrum for a short period of time to sense whether the portion, or the portions, of the unlicensed spectrum is occupied by other transmissions from other devices. In these embodiments, the AN 102 is permitted to use the portion, or the portions, of the unlicensed spectrum for transmission when it senses that the portion, or the portions, of the unlicensed spectrum are free of other transmissions. Often times, these various regulatory rules specify a channel occupancy time (COT) upon with the AN 102 is permitted to use the portion, or the portions, of the unlicensed spectrum for transmission. Otherwise, the AN 102 is prohibiting from transmitting when it senses that the portion, or the portions, of the unlicensed spectrum are occupied by other transmissions. Various exemplary downlink beam scheduling procedures for use within the unlicensed spectrum are to be described in further detail below in FIG. 3A through FIG. 3C, FIG. 4, FIG. 5, FIG. 6A, FIG. 6B, and FIG. 6C.

Figure 3A:
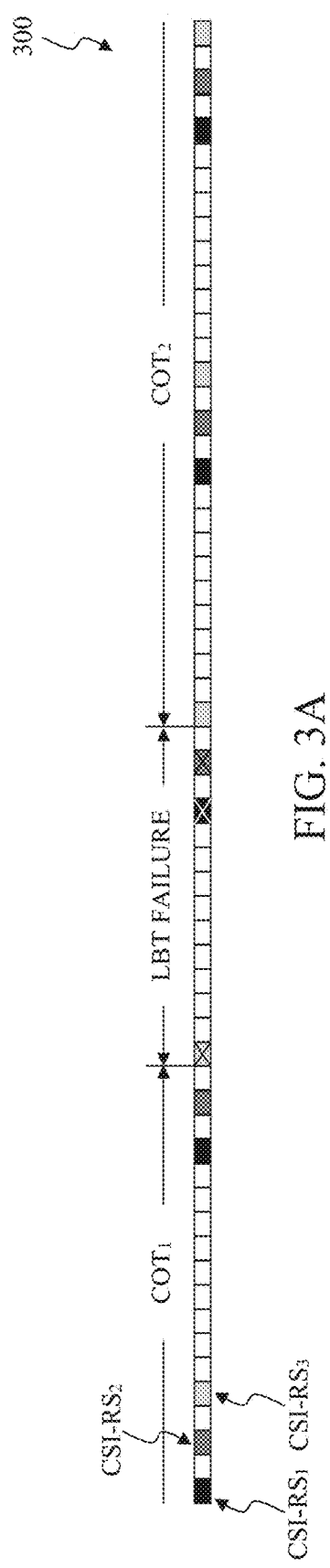
FIG. 3A through FIG. 3C graphically illustrate exemplary downlink beam scheduling procedures that can be utilized by the exemplary wireless network for unlicensed operation in accordance with various embodiments.
Figure 3B:
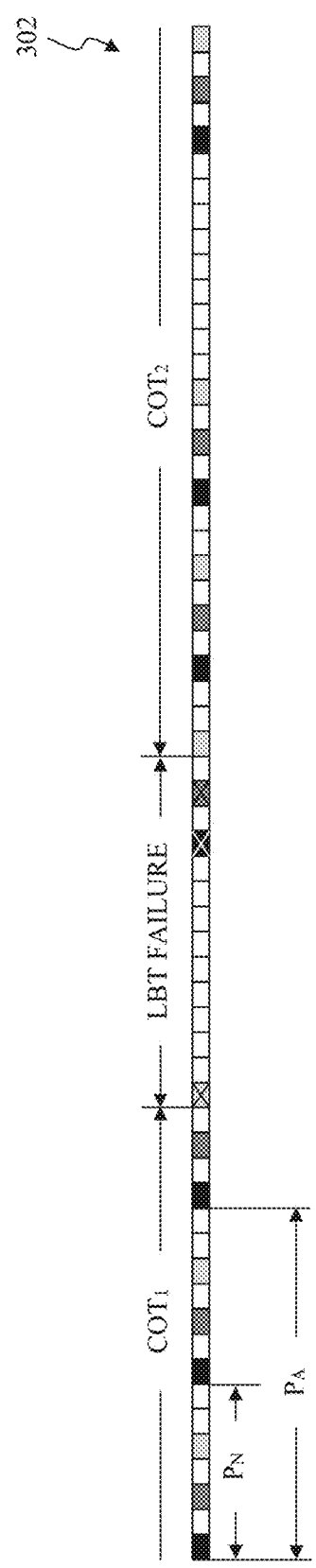
Figure 3C:
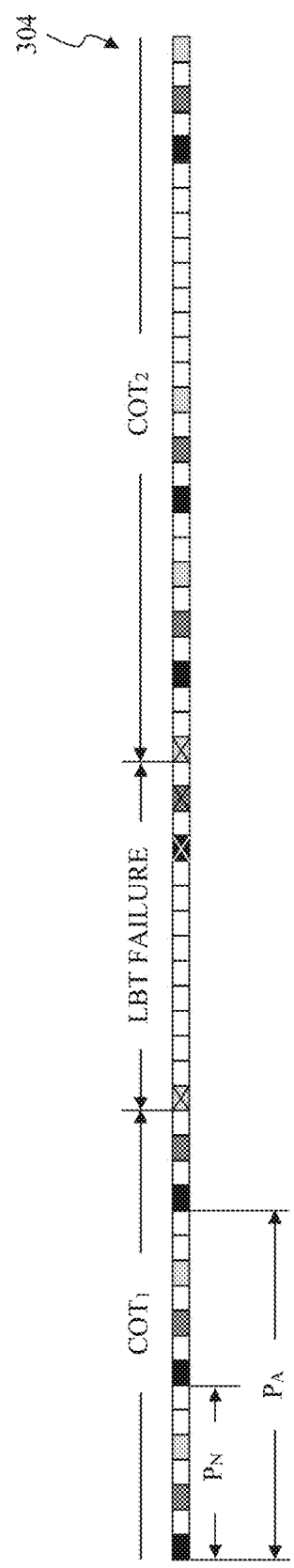

FIG. 3A through FIG. 3C graphically illustrate exemplary downlink beam scheduling procedures that can be utilized by the exemplary wireless network for unlicensed operation in accordance with various embodiments. As described above in FIG. 1, the AN 102 can perform a downlink beam scheduling procedure to selectively control which downlink communication beams from among the downlink communication beams 106.1 through 106.m are to be used to transmit the channel-state information reference signals (CSI-RSs) to the UE 104. In the exemplary embodiments illustrated in FIG. 3A through FIG. 3C, the AN 102 can perform the exemplary downlink beam scheduling procedures to be described in further detail below to periodically and/or aperiodically transmit at least $CSI-RS_1$ through $CSI-RS_3$ over the downlink communication beams 106.1 through 106.3. Throughout FIG. 3A through FIG. 3C, the $CSI-RS_1$ is illustrated using dark shading, the CSI-RS2 is illustrated using medium shading, and the $CSI-RS_3$ is illustrated using light shading. It should be noted that the various exemplary downlink beam scheduling procedures illustrated in FIG. 3A through FIG. 3C are not limited to the $CSI-RS_1$ through the $CSI-RS_3$. Those skilled in the relevant art(s) will recognize that these exemplary downlink beam scheduling procedures can be utilized to schedule transmission of any suitable number of CSI-RSs over any suitable number of downlink communication beams from among the downlink communication beams 106.1 through 106.m that will be apparent to those skilled in the relevant art(s) without departing from the spirit and scope of the present disclosure.

As illustrated in FIG. 3A, the AN 102 can perform a first downlink beam scheduling procedure 300 to schedule a periodic transmission and/or an aperiodic transmission of the $CSI-RS_1$ through the $CSI-RS_3$ over the downlink communication beams 106.1 through 106.3. In some embodiments, the downlink beam scheduling procedure 300 can schedule the periodic and/or the aperiodic transmission of the $CSI-RS_1$ through the $CSI-RS_3$ to be substantially similar to one or more of the beam scheduling procedures as described above in FIG. 2A through FIG. 2E. In the exemplary embodiment illustrated in FIG. 3A, the AN 102 can process and/or transmit a first instance of the $CSI-RS_1$ through the $CSI-RS_3$ as scheduled by the first downlink beam scheduling procedure 300 during a first channel occupancy time ($COT_1$). However, as illustrated in FIG. 3A, while the AN 102 is processing and/or transmitting a second instance of the $CSI-RS_1$ through the $CSI-RS_3$, the LBT procedure indicates that the spectrum, for example, the unlicensed spectrum as described above, carrying the downlink communication beams 106.1 through 106.3 is now occupied by other transmissions which is denoted as an LBT Failure in FIG. 3A. In the exemplary embodiment illustrated in FIG. 3A through FIG. 3C, the LBT procedure can generate an indication of the LBT Failure when the portion, or the portions, of the unlicensed spectrum is occupied by other transmissions from other devices. In some embodiments, the AN 102 can ignore or skip those CSI-RSs from among the CSI-RSi through the $CSI-RS_3$ which the first downlink beam scheduling procedure 300 has scheduled to process and/or transmit during the LBT Failure. For example, as illustrated in FIG. 3A, the AN 102 can ignore or skip the second instance of the $CSI-RS_3$, which is denoted using an "X" in FIG. 3A, which occurs during the LBT Failure. As another example, as illustrated in FIG. 3A, the AN 102 can ignore or skip a third instance of the $CSI-RS_1$ and a third instance of the $CSI-RS_2$, which are also denoted using an "X" in FIG. 3A, which occur during the LBT Failure. In this other example, the AN 102 can process and/or transmit a third instance of the CSI-RS3 which occurs during a second channel occupancy time ($COT_2$) when the spectrum carrying the downlink communication beams 106.1 through 106.3 is not occupied by other transmissions.

In some embodiments, for example, operation in the unlicensed spectrum, the AN 102 can provide one or more channel occupancy time (COT) indicators to the UE 104 to allow the UE 104 to indicate the scheduling of the CSI-RSi through the CSI-RS3 on the downlink communication beams 106.1 through 106.3. In some embodiments, the one or more channel occupancy time (COT) indicators can be formatted according to the following structure: <Frequency Domain Structure> <Duration> <Specific Beam Schedule> to signal the time at which the CSI-RSs will be periodically transmitted on a specific beam, wherein the field <Frequency Domain Structure> describes the one or more time-frequency resources to be used to transmit the $CSI-RS_1$ through the $CSI-RS_3$, the field <Duration> describes a duration in time of the CSI-RS$_1$ through the CSI-RS$_3$, and the field <Specific Beam Schedule> describes which downlink communication beams from among the downlink communication beams 106.1 through 106.3 are to transmit the CSI-RS$_1$ through the CSI-RS$_3$. In these embodiments, the AN 102 can provide one or more channel occupancy time (COT) indicators on any suitable number of downlink communication beams from among the downlink communication beams 106.1 through 106.$m$ that will be apparent to those skilled in the relevant art(s). In some embodiments, for example, aperiodic transmission in the unlicensed spectrum, the one or more channel occupancy time (COT) indicators can be formatted according to the following structure: <Frequency Domain Structure> <Duration> <Specific Beam Schedule> <CSI-RS schedule> to signal the time at which the CSI-RSs will be aperiodically transmitted on a specific beam, wherein the field <CSI-RS schedule> describes the timing of the CSI-RS$_1$ through the CSI-RS$_3$.

In some embodiments, for example, operation in the licensed spectrum, the AN 102 can utilize a periodic or Semi-Persistent (SP) CSI-RS resource that is activated by a Downlink Control Information (DCI) message and/or a Group Common Physical Downlink Control (GC-PDCCH) to communication one or more beam indicators to the UE 104 to indicate the scheduling of the CSI-RS$_1$ through the CSI-RS$_3$ on the downlink communication beams 106.1 through 106.3. In some embodiments, the one or more beam indicators can be formatted according to the following structure: <Frequency Domain Structure> <Duration> <Specific Beam Schedule> to signal the time at which the CSI-RSs will be periodically transmitted on a specific beam, wherein the field <Frequency Domain Structure> describes the one or more time-frequency resources to be used to transmit the CSI-RS$_1$ through the CSI-RS$_3$, the field <Duration> describes a duration in time of the CSI-RS$_1$ through the CSI-RS$_3$, and the field <Specific Beam Schedule> describes which downlink communication beams from among the downlink communication beams 106.1 through 106.3 are to transmit the CSI-RS$_1$ through the CSI-RS$_3$. In these embodiments, the AN 102 can provide one or more beam indicators on any suitable number of downlink communication beams from among the downlink communication beams 106.1 through 106.$m$ that will be apparent to those skilled in the relevant art(s). In some embodiments, for example, aperiodic transmission in the unlicensed spectrum, the one or more beam indicators can be formatted according to the following structure: <Frequency Domain Structure> <Duration> <Specific Beam Schedule> <CSI-RS schedule> to signal the time at which the CSI-RSs will be aperiodically transmitted on a specific beam, wherein the field <CSI-RS schedule> describes the timing of the CSI-RS$_1$ through the CSI-RS$_3$.

As illustrated in FIG. 3B and FIG. 3C, the AN 102 can perform a second downlink beam scheduling procedure 302 and a third downlink beam scheduling procedure 304, respectively, to schedule the periodic and/or the aperiodic transmission of the CSI-RS$_1$ through the CSI-RS3 over the downlink communication beams 106.1 through 106.3. In the exemplary embodiments illustrated in FIG. 3B and FIG. 3C, the second downlink beam scheduling procedure 302 and the third downlink beam scheduling procedure 304, respectively, can decrease the periodicity of the CSI-RS$_1$ through the CSI-RS$_3$ over the downlink communication beams 106.1 through 106.3 as compared to periodicity of the transmission of the CSI-RS$_1$ through the CSI-RS$_3$ as illustrated in FIG. 3A. In some embodiments, this decrease in the periodicity of the CSI-RS$_1$ through the CSI-RS$_3$ can effectively increase coverage of the AN 102. In some embodiments, the second downlink beam scheduling procedure 302 and the third downlink beam scheduling procedure 304, respectively, can schedule the periodic and/or the aperiodic transmission of the CSI-RS$_1$ through the CSI-RS$_3$ in accordance with a nominal period $P_N$ and an actual period $P_A$ as illustrated in FIG. 3B and FIG. 3C. In these embodiments, the nominal period $P_N$ represents a period of time of potential CSI-RS transmissions and the actual period $P_A$ represents a period of time of actual CSI-RS transmissions. For example, the second downlink beam scheduling procedure 302 and the third downlink beam scheduling procedure 304 can schedule the periodic and/or the aperiodic transmission of an instance of the CSI-RS$_1$ through the CSI-RS$_3$ over the nominal period $P_N$. In this example, the AN 102 can process the instance of the CSI-RS$_1$ through the CSI-RS$_3$ within the nominal period $P_N$ to extend the instance of the CSI-RS$_1$ through the CSI-RS$_3$ to multiple instances of the CSI-RS$_1$ through the CSI-RS$_3$ and can thereafter transmit the multiple instances of the CSI-RS$_1$ through the CSI-RS$_3$ over the actual period $P_A$.

As illustrated in FIG. 3B, the AN 102 can ignore or skip those CSI-RSs from among the CSI-RS$_1$ through the CSI-RS$_3$ which the second downlink beam scheduling procedure 302 has scheduled to process and/or transmit during the LBT Failure. For example, as illustrated in FIG. 3B, the AN 102 can ignore or skip a third instance of the CSI-RS$_3$, which is denoted using an "X" in FIG. 3B, which occurs during the LBT Failure. As another example, as illustrated in FIG. 3B, the AN 102 can ignore or skip a fourth instance of the CSI-RS$_1$ and a fourth instance of the CSI-RS$_2$, which are also denoted using an "X" in FIG. 3B, which occur during the LBT Failure but processes and/or transmits a fourth instance of the CSI-RS$_3$ which occurs during a second channel occupancy time (COT$_2$) when the spectrum carrying the downlink communication beams 106.1 through 106.3 is not occupied by other transmissions.

As illustrated in FIG. 3C, the AN 102 can ignore or skip multiple CSI-RSs from among the CSI-RS$_1$ through the CSI-RS$_3$ which the third downlink beam scheduling procedure 304 has scheduled to process and/or transmit during the LBT Failure. For example, as illustrated in FIG. 3B, the AN 102 can ignore or skip a third instance of the CSI-RS$_3$ in its entirety, which is denoted using an "X" in FIG. 3B, which occurs during the LBT Failure. As another example, as illustrated in FIG. 3B, the AN 102 can ignore or skip a fourth instance of the CSI-RS$_1$ through CSI-RS$_3$, which are also denoted using an "X" in FIG. 3B, as a result of the fourth instance of the CSI-RS$_1$ and fourth instance of the CSI-RS$_2$ occur during the LBT Failure. In this other example, the AN 102 can process and/or transmit a fifth instance of the CSI-RS$_1$ through CSI-RS$_3$ which occurs during a second channel occupancy time (COT$_2$) when the spectrum carrying the downlink communication beams 106.1 through 106.3 is not occupied by other transmissions.

Figure 4:
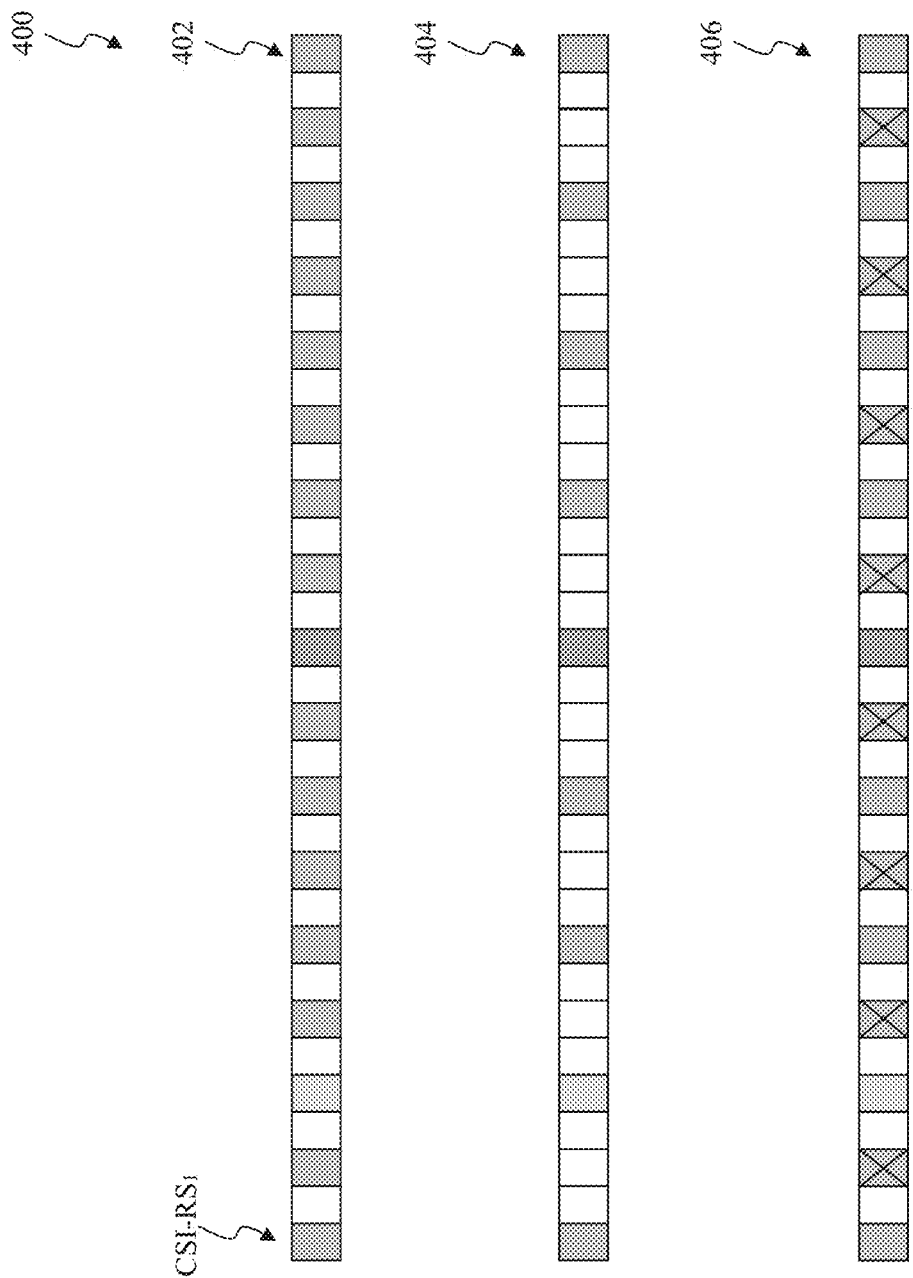
FIG. 4 graphically illustrates another exemplary downlink beam scheduling procedure that can be utilized by the exemplary wireless network for unlicensed operation in accordance with various embodiments.

FIG. 4 graphically illustrates another exemplary downlink beam scheduling procedure that can be utilized by the exemplary wireless network for unlicensed operation in accordance with various embodiments. As described above in FIG. 1, the AN 102 can perform a downlink beam scheduling procedure to selectively control which downlink communication beams from among the downlink communication beams 106.1 through 106.$m$ are to be used to transmit the channel-state information reference signals (CSI-RSs) to the UE 104. In the exemplary embodiment illustrated in FIG. 4, the AN 102 can perform the exemplary downlink beam scheduling procedures to be described in further detail below to periodically and/or aperiodically transmit at least a CSI-RS$_1$ over one or more of the downlink communication beams 106.1 through 106.m. Throughout FIG. 4, the CSI-RS$_1$ is illustrated using medium shading. It should be noted that the various exemplary downlink beam scheduling procedures illustrated in FIG. 4 are not limited to the CSI-RS$_1$. Those skilled in the relevant art(s) will recognize that these exemplary downlink beam scheduling procedures can be utilized to schedule transmission of any suitable number of CSI-RSs over any suitable number of downlink communication beams from among the downlink communication beams 106.1 through 106.m that will be apparent to those skilled in the relevant art(s) without departing from the spirit and scope of the present disclosure.

As illustrated in FIG. 4, the AN 102 can perform a downlink beam scheduling procedure 400 to schedule a periodic transmission and/or an aperiodic transmission of the CSI-RS$_1$ over the downlink communication beams 106.1 through 106.m as illustrated by a CSI-RS schedule 402. Thereafter, the AN 102 can identify valid beam pairings between the AN 102 and the UE 104 for the downlink communication beams 106.1 through 106.m. In the exemplary embodiment illustrated in FIG. 4, the AN 102 can store a listing of slots 404 that are associated with valid beam pairings between the AN 102 and the UE 104. In the exemplary embodiment illustrated in FIG. 4, those slots, for example, a first slot, a fifth slot, a ninth slot, that are shaded in the listing of slots 404 are associated with valid beam pairings between the AN 102 and the UE 104. Thereafter, the AN 102 can identify instances of the CSI-RSi from the CSI-RS schedule 402 that coincide with the valid beam pairings from the listing of slots 404. In some embodiments, the AN 102 can process and/or transmit those instances of the CSI-RS$_1$ that coincide with valid beam pairings between the AN 102 and the UE 104 as indicated by shading in a CSI-RS schedule 406 and can ignore or skip instances of the CSI-RS$_1$ that do not coincide with valid beam pair which are denoted using an "X" in the CSI-RS schedule 406. In some embodiments, the AN 102 can provide the CSI-RS schedule 406 in the one or more channel occupancy time (COT) indicators and/or the one or more beam indicators as described above in FIG. 3A to the UE 104 to allow the UE 104 to determine which instances of the CSI-RS$_1$ have been ignored or skipped by the AN 102.

Figure 5:
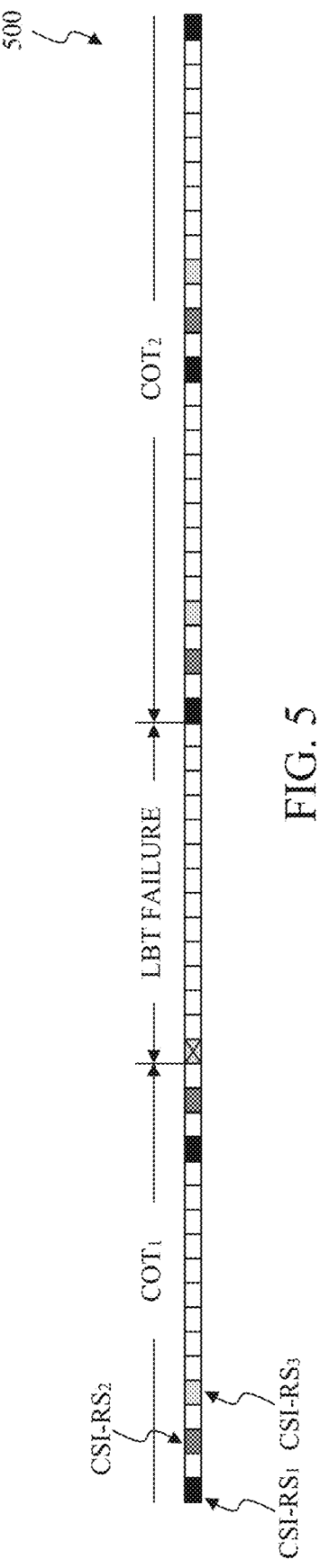
FIG. 5 graphically illustrates a further exemplary downlink beam scheduling procedure that can be utilized by the exemplary wireless network for unlicensed operation in accordance with various embodiments.

FIG. 5 graphically illustrates a further exemplary downlink beam scheduling procedure that can be utilized by the exemplary wireless network for unlicensed operation in accordance with various embodiments. As described above in FIG. 1, the AN 102 can perform a downlink beam scheduling procedure to selectively control which downlink communication beams from among the downlink communication beams 106.1 through 106.m are to be used to transmit the channel-state information reference signals (CSI-RSs) to the UE 104. In the exemplary embodiment illustrated in FIG. 5, the AN 102 can perform the exemplary downlink beam scheduling procedures to be described in further detail below to periodically and/or aperiodically transmit at least CSI-RS$_1$ through CSI-RS$_3$ over the downlink communication beams 106.1 through 106.3. Throughout FIG. 5, the CSI-RS$_1$ is illustrated using dark shading, the CSI-RS$_2$ is illustrated using medium shading, and the CSI-RS$_3$ is illustrated using light shading. It should be noted that the various exemplary downlink beam scheduling procedures illustrated in FIG. 5 are not limited to the CSI-RS$_1$ through the CSI-RS$_3$. Those skilled in the relevant art(s) will recognize that these exemplary downlink beam scheduling procedures can be utilized to schedule transmission of any suitable number of CSI-RSs over any suitable number of downlink communication beams from among the downlink communication beams 106.1 through 106.m that will be apparent to those skilled in the relevant art(s) without departing from the spirit and scope of the present disclosure.

As illustrated in FIG. 5, the AN 102 can perform a downlink beam scheduling procedure 500 to schedule a periodic transmission and/or an aperiodic transmission of the CSI-RS$_1$ through the CSI-RS$_3$ over the downlink communication beams 106.1 through 106.3. In some embodiments, the downlink beam scheduling procedure 300 can schedule the periodic and/or the aperiodic transmission of the CSI-RS$_1$ through the CSI-RS$_3$ to be substantially similar to one or more of the beam scheduling procedures as described above in FIG. 2A through FIG. 2E. In the exemplary embodiment illustrated in FIG. 5, the AN 102 can process and/or transmit a first instance of the CSI-RS$_1$ through the CSI-RS$_3$ as scheduled by the downlink beam scheduling procedure 500 during a first channel occupancy time (COL). However, as illustrated in FIG. 5, while the AN 102 is processing and/or transmitting a second instance of the CSI-RS$_1$ through the CSI-RS$_3$, the LBT procedure indicates that the spectrum, for example, the unlicensed spectrum as described above, carrying the downlink communication beams 106.1 through 106.3 is now occupied by other transmissions which is denoted as an LBT Failure in FIG. 5. In the exemplary embodiment illustrated in FIG. 5, the LBT procedure can generate an indication of the LBT Failure when the portion, or the portions, of the unlicensed spectrum is occupied by other transmissions from other devices. In some embodiments, the AN 102 can ignore or skip those CSI-RSs from among the CSI-RS$_1$ through the CSI-RS$_3$ which the downlink beam scheduling procedure 500 has scheduled to process and/or transmit during the LBT Failure. For example, as illustrated in FIG. 5, the AN 102 can ignore or skip the second instance of the CSI-RS3, which is denoted using an "X" in FIG. 5, which occurs during the LBT Failure. In some embodiments, the AN 102 can process and/or transmit a third instance of the CSI-RSi through the CSI-RS3 during a second channel occupancy time (COT2) when the spectrum carrying the downlink communication beams 106.1 through 106.3 is not occupied by other transmissions. As illustrated in FIG. 5, the AN 102 can begin to process and/or transmit the third instance of the CSI-RS$_1$ through the CSI-RS$_3$ during a start of the second channel occupancy time (COT$_2$) with the periodicity of the CSI-RS$_1$ through the CSI-RS$_3$ starting from the start of the second channel occupancy time (COT$_2$). In some embodiments, the AN 102 can provide the one or more channel occupancy time (COT) indicators and/or the one or more beam indicators as described above in FIG. 3A to the UE 104 to allow the UE 104 to determine which instances of the CSI-RS$_1$ through the CSI-RS$_3$ have been ignored or skipped by the AN 102 and/or the start of the second channel occupancy time (COT$_2$).

FIG. 6A through FIG. 6C graphically illustrate yet further exemplary downlink beam scheduling procedures that can be utilized by the exemplary wireless network for unlicensed operation in accordance with various embodiments. As described above in FIG. 1, the AN 102 can perform a downlink beam scheduling procedure to selectively control which downlink communication beams from among the downlink communication beams 106.1 through 106.m are to be used to transmit the channel-state information reference signals (CSI-RSs) to the UE 104. In the exemplary embodiments illustrated in FIG. 6A through FIG. 6C, the AN 102 can perform the exemplary downlink beam scheduling procedures to be described in further detail below to periodically and/or aperiodically transmit at least the $CSI\text{-}RS_1$ over the downlink communication beams 106.1 through 106.*m*. Throughout FIG. 6A through FIG. 6C, the CSI-RS is illustrated using medium shading. It should be noted that the various exemplary downlink beam scheduling procedures illustrated in FIG. 6A through FIG. 6C are not limited to the $CSI\text{-}RS_1$. Those skilled in the relevant art(s) will recognize that these exemplary downlink beam scheduling procedures can be utilized to schedule transmission of any suitable number of CSI-RSs over any suitable number of downlink communication beams from among the downlink communication beams 106.1 through 106.*m* that will be apparent to those skilled in the relevant art(s) without departing from the spirit and scope of the present disclosure.

As illustrated in FIG. 6A, the AN 102 can perform a first downlink beam scheduling procedure 600 to schedule a periodic transmission and/or an aperiodic transmission of the $CSI\text{-}RS_1$ over the downlink communication beams 106.1 through 106.*m*. In some embodiments, the first downlink beam scheduling procedure 600 can schedule the periodic and/or the aperiodic transmission of the $CSI\text{-}RS_1$ to be substantially similar to one or more of the beam scheduling procedures as described above in FIG. 2A through FIG. 2E. In the exemplary embodiment illustrated in FIG. 6A, the AN 102 can process and/or transmit the periodic transmission and/or the aperiodic transmission of the $CSI\text{-}RS_1$ as scheduled by the first downlink beam scheduling procedure 600 to be within a blind CSI-RS range. In the exemplary embodiment illustrated in FIG. 6A, the blind CSI-RS range represents a tolerance range that the UE 104 is expected to blindly search for the $CSI\text{-}RS_1$. In some embodiments, the tolerance range can be based upon the periodicity of the $CSI\text{-}RS_1$.

As illustrated in FIG. 6B and FIG. 6C, the AN 102 can perform a second downlink beam scheduling procedure 602 and a third downlink beam scheduling procedure 604, respectively, to schedule a periodic transmission and/or an aperiodic transmission of the CSI-RSi over the downlink communication beams 106.1 through 106.*m*. In some embodiments, the downlink beam scheduling procedure 600 can schedule the periodic and/or the aperiodic transmission of the CSI-RSi to be substantially similar to one or more of the beam scheduling procedures as described above in FIG. 2A through FIG. 2E. In the exemplary embodiment illustrated in FIG. 6B and FIG. 6C, the AN 102 can process and/or transmit the periodic transmission and/or the aperiodic transmission of the CSI-RSi as scheduled by the second downlink beam scheduling procedure 602 and/or the third downlink beam scheduling procedure 604 to be within a CSI-RS range with indication. In the exemplary embodiment illustrated in FIG. 6B and FIG. 6C, the AN 102 can provide one or more discoverable indicators, such as the one or more channel occupancy time (COT) indicators and/or the one or more beam indicators as described above in FIG. 3A, to signal presence of CSI-RSi in a specific position within the CSI-RS range with indication. In the exemplary embodiment illustrated in FIG. 6B, the AN 102 can provide the one or more discoverable indicators within the tolerance range, namely, within the CSI-RS range with indication. In the exemplary embodiment illustrated in FIG. 6B, the AN 102 can provide the one or more discoverable indicators before the tolerance range, namely, before the CSI-RS range with indication. In some embodiments, the one or more discoverable indicators can indicate parameters for a single CSI tolerance range or more than one CSI-RS tolerance range, for example, semi-persistent signaling. In these embodiments, the parameters can include time and/or frequency location, for example, as an offset within variable period, and/or a number of periods for which indicator is valid. In some embodiments, the one or more discoverable indicators can be combined with beam-scheduling information, for example, as described above in FIG. 5, in one or more Downlink Control Information (DCI) messages. In some embodiments, the one or more DCI messages can indicate that CSI-RSi is frequency division multiplexed with data and is Quasi Co-Located with specific Synchronization Signal Blocks (SSBs), CSI-RSi is Quasi Co-Located with specific specific Synchronization Signal Blocks (SSBs) and can be used for BFR, and/or CSI-RSi is to be used for beam failure recovery (BFR).

Exemplary Beam Failure Detection (BFD) Procedures

As describe above in FIG. 1, the UE 104 can utilize the channel-state information reference signal (CSI-RS) within a downlink communication beam from among the downlink communication beams 106.1 through 106.*m* as described above in FIG. 1 to assess a radio link quality of the downlink communication beam. In some embodiments, the UE 104 can monitor the radio link quality of the downlink communication beam and can thereafter provide an indication, referred as a beam failure indication (BFI), when the radio link quality of the downlink communication beam indicates the downlink communication beam is failing. In some embodiments, the UE 104 can monitor a predetermined PDCCH block error rate (BLER) of the CSI-RS to determine whether the downlink communication beam is failing. In some embodiments, the UE 104 can be configured with a set of CSI-RS resources, referred to as set q0, for beam failure detection (BFD). In these embodiments, the UE 104 can measure the radio link quality of the downlink communication beam in the CSI-RS resource set q0. When the measured radio link quality for the CSI-RS resources in set q0 is worse than a pre-defined threshold, the UE 104 can identify the downlink communication beam as failing. The UE 104 can generate a beam failure indication (BFI) when the downlink communication beam is identified as failing. When the number of BFIs reaches a certain value or threshold, for example, a maximum number of beam failure indications, MBH, the UE 104 can begin a beam failure recovery (BFR) procedure as to be described in further detail.

Figure 7:
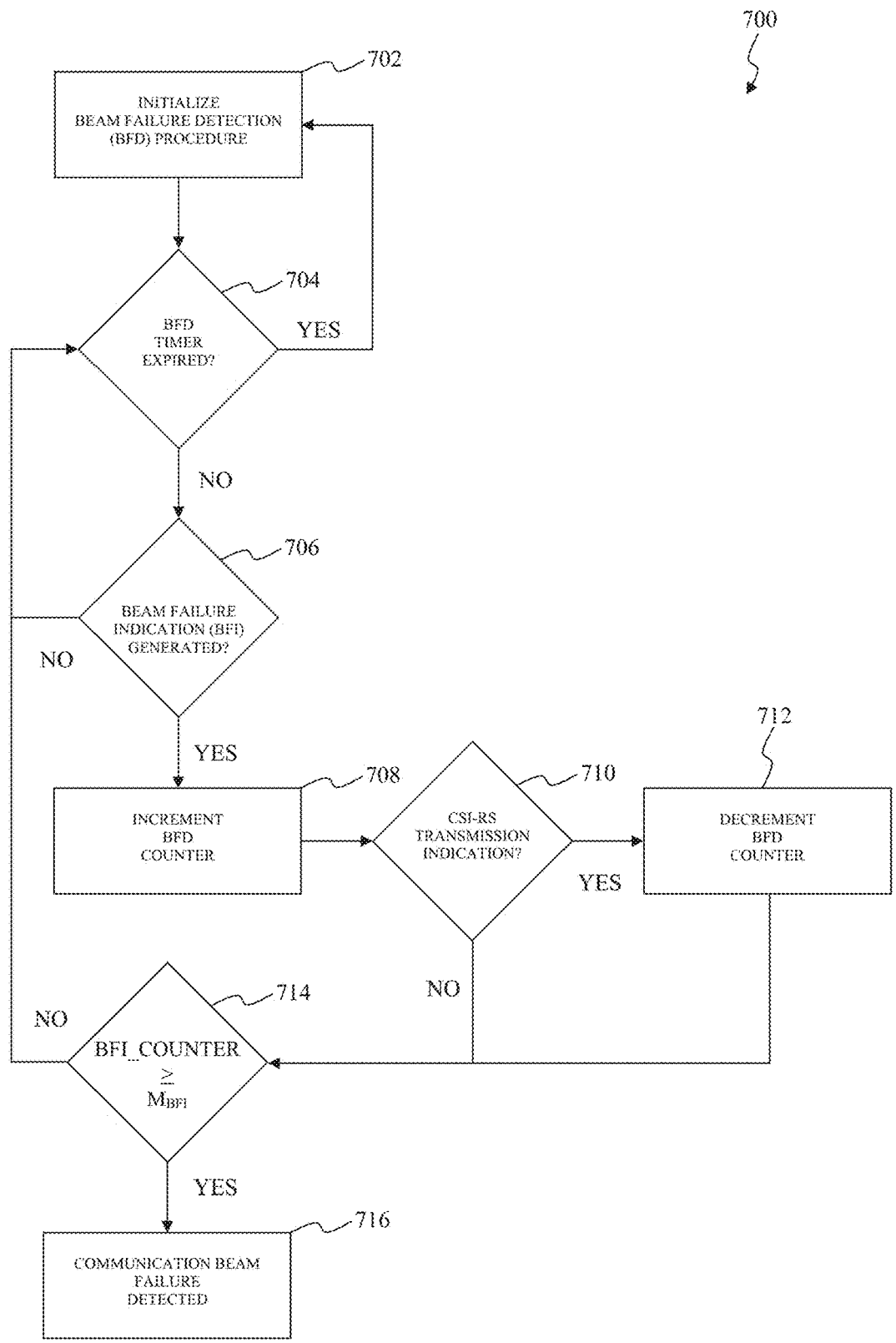
FIG. 7 illustrates a flowchart of an exemplary beam failure detection (BFD) procedure that can be utilized by the exemplary wireless network in accordance with various embodiments.

FIG. 7 illustrates a flowchart of an exemplary beam failure detection (BFD) procedure that can be utilized by the exemplary wireless network in accordance with various embodiments. The disclosure is not limited to this operational description. Rather, it will be apparent to ordinary persons skilled in the relevant art(s) that other operational control flows are within the scope and spirit of the present disclosure. The following discussion describes an exemplary operational control flow 700 which executes the exemplary BFD procedure to identify a downlink communication beam within the exemplary wireless network that is failing. In the exemplary embodiment illustrated in FIG. 7, the exemplary operational control flow 700 can be performed by a UE, such as the UE 104 as described above in FIG. 1, to detect a downlink communication beam from among the downlink communication beams 106.1 through 106.*m* that has failed.

At operation 702, the exemplary operational control flow 700 initializes the exemplary beam failure detection (BFD) procedure as to be described in further detail below in operation 704 through 716. As part of this initialization, the exemplary operational control flow 700 sets a beam failure indication counter to an initial value, such as zero (0) to provide an example. As to be described in further detail below, the exemplary operational control flow 700 accumulates the number of the beam failure indications (BFIs) that are generated during a beam failure detection (BFD) window as indicated by a beam failure detection timer. In some embodiments, the exemplary operational control flow 700 can additionally, or alternatively, start, or re-start, the beam failure detection timer at operation 702. As to be described in further detail below, the exemplary operational control flow 700 can accumulate the beam failure indications (BFIs) before expiration of the beam failure detection timer to determine whether the downlink communication beam has failed.

At operation 704, the exemplary operational control flow 700 determines whether the beam failure detection timer from operation 702 has expired. If the exemplary operational control flow 700 determines the beam failure detection timer from operation 702 has expired, the operational control flow 700 reverts to operation 702 to once again set the beam failure indication counter from operation 702 to the initial value and to start, or re-start, the beam failure detection timer from operation 702. Otherwise, the operational control flow 700 proceeds to operation 706 when the beam failure detection timer from operation 702 has not expired.

At operation 706, the exemplary operational control flow 700 monitors a radio link quality of the downlink communication beam and can thereafter generate an indication, referred as a beam failure indication (BFI), when the radio link quality of the downlink communication beam indicates the downlink communication beam is failing. In some embodiments, the exemplary operational control flow 700 can monitor a block error rate (BLER) of a channel-state information reference signal (CSI-RS) within the downlink communication beam to determine whether the downlink communication beam is failing. In these embodiments, the exemplary operational control flow 700 can determine that the downlink communication beam is failing when the BLER of the CSI-RS meets or exceeds a predetermined PDCCH BLER target, also referred to as an out-of-sync (OOS) threshold Qout,LR. In some embodiments, predetermined PDCCH BLER target can represent a percentage of a predetermined PDCCH BLER of a predetermined PDCCH transmission.

In some embodiments, an access node (AN), such as the AN 102 to provide an example, can configure the predetermined PDCCH BLER target for use by the exemplary operational control flow 700 and can thereafter provide the predetermined PDCCH BLER target to the exemplary operational control flow 700 in one or more Downlink Control Information (DCI) messages. In some embodiments, the predetermined PDCCH BLER target can be based upon properties of the CSI-RS, for example, a periodicity of the CSI-RS and/or on the type of environment, for example, licensed or unlicensed access. In some embodiments, the predetermined PDCCH BLER target is selected based on a periodicity of the CSI-RS, for example, the periodicity of the CSI-RS as illustrated in FIG. 2A through FIG. 2E above. For example, the periodicity of the CSI-RS can be set to a value of one (1) to generate a predetermined PDCCH BLER target of 10%, for example, 10% BLER of PDCCH transferring DCI format 1_0 having a Control Channel Element(CCE) Aggregation Length of eight (8) 8 and a Control Resource Set (CORESET) length of two (2), in a licensed access environment or a Rel-15 or Rel-16 environment. In another example, the periodicity of the CSI-RS can be set to a value of two (2) to generate a predetermined PDCCH BLER target less than 10%, for example 5%, to allow for more sensitivity to beam failure and/or greater than 10%, for example, 15%, to account for losses from listen before talk (LBT) skipping and/or from random beam scheduling. Alternatively, or in addition to, the predetermined PDCCH BLER target can be set to a single value for all periodicities of the CSI-RS and can be dynamically adjusted to account for scenarios, such as a LBT scenario to provide an example, where the AN 102 does not transmit the CSI-RS to the UE. In some embodiments, the exemplary operational control flow 700 can modify the predetermined PDCCH BLER target in response to indications of non-scheduling and/or non-transmission of the CSI-RS by the AN 102, for example, the one or more channel occupancy time (COT) indicators and/or the one or more beam indicators as described above in FIG. 3A.

At operation 706, the exemplary operational control flow 700 reverts to operation 704 to once again determine whether the beam failure detection timer from operation 702 has expired when the beam failure indication (BFI) has not been generated. Otherwise, the operational control flow 700 proceeds to operation 708 when the beam failure indication (BFI) has been generated.

At operation 708, the exemplary operational control flow 700 increments the beam failure indication counter from operation 702 in response to the beam failure indication (BFI) being generated at operation 708.

At operation 710, the exemplary operational control flow 700 determines whether the AN 102 is scheduled to transmit or transmits the CSI-RS within the downlink communication beam at various instances in time. In some embodiments, the exemplary operational control flow 700 evaluates a CSI-RS transmission indication, such as the one or more channel occupancy time (COT) indicators and/or the one or more channel occupancy time (COT) indicators and/or the one or more beam indicators as described above in FIG. 3A, to determine whether the AN 102 is to transmit the CSI-RS within the downlink communication beam. In some embodiments, the AN 102 can provide the CSI-RS transmission indication to the exemplary operational control flow 700 in one or more Downlink Control Information (DCI) messages. In some embodiments, the exemplary operational control flow 700 can generate the beam failure indication (BFI) at operation 706 even when the AN 102 does not transmit, for example, is not scheduled to transmit, the CSI-RS within the downlink communication beam. In these situations, the exemplary operational control flow 700 evaluates the CSI-RS transmission indication to determine whether the AN 102 is to transmit the CSI-RS within the downlink communication beam for every beam failure indication (BFI) generated by the exemplary operational control flow 700 at operation 708. However, in some embodiments, the exemplary operational control flow 700 can perform operation 710 and operation 712, which is to be described in further detail below, prior to operation 706.

At operation 710, the exemplary operational control flow 700 proceeds to operation 712 when the CSI-RS transmission indication indicates that the AN 102 is not to transmit the CSI-RS within the downlink communication beam. Otherwise, the exemplary operational control flow 700 proceeds to operation 714 when the CSI-RS transmission indication indicates that the AN 102 is to transmit the CSI-RS within the downlink communication beam.

At operation 712, the exemplary operational control flow 700 decrements the beam failure indication counter from operation 702 in response to the CSI-RS transmission indication indicating that the AN 102 is to transmit the CSI-RS within the downlink communication beam.

At operation 714, the exemplary operational control flow 700 compares the beam failure indication counter from operation 702 which has accumulated the beam failure indications (BFIs) generated before the expiration of the beam failure detection timer from operation 702 with a maximum number of beam failure indications, $M_{BFI}$. The exemplary operational control flow 700 reverts to operation 704 to once again determine whether the beam failure detection timer from operation 702 has expired when the beam failure indication counter from operation 702 is less than the maximum number of beam failure indications $M_{BFI}$. Otherwise, the operational control flow 700 proceeds to operation 716 when the beam failure indication counter from operation 702 is greater than or equal to the maximum number of beam failure indications $M_{BFI}$.

At operation 716, the exemplary operational control flow 700 determines that the downlink communication beam has failed. In some embodiments, the UE executing the exemplary operational control flow 700 can begin a beam failure recovery (BFR) procedure, as to be described in further detail below, once the exemplary operational control flow 700 determines that the downlink communication beam has failed.

Exemplary Beam Failure Recovery Procedures

Once the UE 104 has determined the downlink communication beam has failed as described above, the UE 104 undergoes a beamforming failure recovery (BFR) procedure as to be described in further detail below. As part of this BFR procedure, the UE 104 identifies one or more new candidate downlink communication beams from among the downlink communication beams 106.1 through 106.m from a candidate beam list and thereafter identifies the one or more new candidate downlink communication beams in a beam failure recovery request (BFRQ) provided to the AN 102 over one or more contention free uplink channels, such as a physical random access channel (PRACH) and/or one or more contention uplink control channels, such as a Physical Uplink Control Channel (PUCCH) and/or a Physical Uplink Shared Channel (PUSCH), to provide some examples. In some embodiments, the PRACH, the PUCCH, and/or the PUSCH can represent uplink control channels associated with the downlink communication beam that has failed. In some embodiments, the UE 104 can identify a corresponding PRACH when there is a change to the periodic CSI-RS. In some embodiments, the AN 102 can configure an increased number of PRACH resources per possible CSI-RS resource whereby the UE 104 can identify closest PRACH occasion to the one or more new candidate downlink communication beams. In some embodiments, these of PRACH resources can be shifted relative to the start of the COT when the CSI-RS is similarly shifted relatively to the start of the COT. In some embodiments the one or more Downlink Control Information (DCI) messages can include contains resources for the associated RACH, for example, can indicate one or more of k3 (relative slot from CSI-RS resource), frequency resource and/or time resource within the relative slot. In some embodiments, the BFRQ identifies an identifier of the UE 104 and the one or more new candidate downlink communication beams. Thereafter, the UE 104 monitors downlink control channels, for example, a Physical Downlink Control Channel (PDCCH) and/or a Physical Downlink Shared Channel (PDSCH), corresponding to the one or more new candidate downlink communication beams for a response from the AN 102 to the BFRQ, and can thereafter utilize the one or more new candidate downlink communication beams upon receiving the response from the AN 102.

Figure 8:
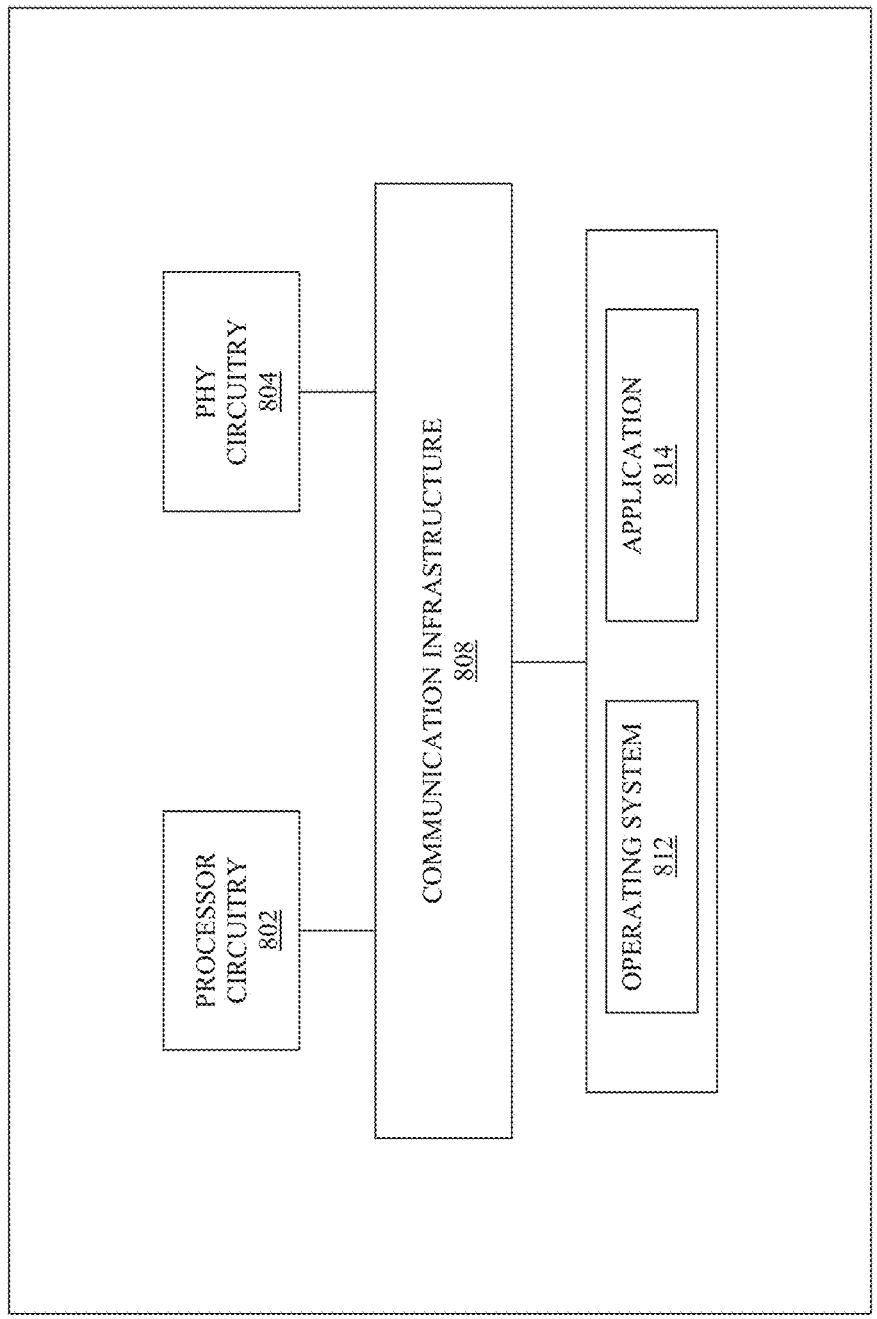
FIG. 8 illustrates a block diagram of exemplary wireless systems of electronic devices according to some embodiments of the disclosure.

Exemplary Embodiments for Access Nodes and/or User Equipment (UE) Within the Exemplary Wireless Network FIG. 8 illustrates a block diagram of exemplary wireless systems of electronic devices according to some embodiments of the disclosure. In the exemplary embodiment illustrated in FIG. 8, a wireless system 800 of the electronic device can include processor circuitry 802, physical layer (PHY) circuitry 804, an antenna array 806, a communication infrastructure 808, and a memory subsystem 810. The wireless system 800 as illustrated in FIG. 8 can be implemented as a standalone, or a discrete device, and/or can be incorporated within or coupled to another electrical device, or host device, such as a wireless communication device, a smart phone, a laptop computing device, a desktop computing device, a tablet computing device, a personal assistants, a monitor, a television, a wearable device, and/or any other suitable electronic device that will be apparent to those skilled in the relevant art(s). The wireless system 800 as illustrated in FIG. 8 can represent an exemplary embodiment of the AN 102 and/or the UE 104 as described above in FIG. 1 and/or can be incorporated within or coupled to the AN 102 and/or the UE 104 as described above in FIG. 1.

In the exemplary embodiment illustrated in FIG. 8, the processor circuitry 802 can include, or can be, any of a microprocessor, graphics processing unit, or digital signal processor, and their electronic processing equivalents, such as an Application Specific Integrated Circuit (ASIC) or Field Programmable Gate Array (FPGA). The processor circuitry 802 signifies one or more tangible data and information processing devices that physically transform data and information, typically using sequence transformations, also referred to as an operational control flow. Data and information can be physically represented by an electrical, magnetic, optical or acoustical signal that is capable of being stored, accessed, transferred, combined, compared, or otherwise manipulated by the processor circuitry 802. The processor circuitry 802 can signify a singular processor and multi-core systems or multi-processor arrays, including graphic processing units, digital signal processors, digital processors or combinations of these elements. In some embodiments, the processor circuitry 802 can execute one or more elements of a protocol stack, for example one or more elements of a 5G protocol stack as to be described below in further detail.

The PHY circuitry 804 includes circuitry and/or control logic to carry out various radio/network protocol and radio control functions that enable communication with one or more radio networks. The radio control functions can include, but are not limited to, signal modulation/demodulation, encoding/decoding, and/or radio frequency shifting to provide some examples. In some embodiments, the PHY circuitry 804 can perform Fast-Fourier Transform (FFT), pre-coding, and/or constellation mapping/de-mapping functionality. In some embodiments, the PHY circuitry 804 can perform convolution, tail-biting convolution, turbo, Viterbi, and/or Low Density Parity Check (LDPC) encoding/decoding. In the exemplary embodiment illustrated in FIG. 8, the PHY circuitry 804 can process baseband signals received from the communication infrastructure 808 and to generate baseband signals for the communication infrastructure 808. In some embodiments, the PHY circuitry 804 can connect to and communicate on wireline and/or wireless networks. For example, the PHY circuitry 804 can include a wireless subsystem, for example, cellular subsystem, a WLAN subsystem, and/or a Bluetooth™ subsystem, having various wireless radio transceiver and wireless protocol(s) as will be understood by those skilled in the relevant art(s) without departing from the sprit and scope of the disclosure. The wireless subsystem can include circuitry and/or control logic for connecting to and communicating on wireless networks. The wireless networks can include cellular networks such as, but are not limited to, 3G/4G/5G wireless networks, Long-Term Evolution (LTE) wireless networks, and the like to provide some examples.

In some embodiments, the processor circuitry 802 and/or the PHY circuitry 804 can execute the 5G protocol stack having at least a 5G layer-1, a 5G layer-2, and a 5G layer-3. The 5G layer-1 can include a physical (PHY) layer. The PHY layer can transmit and/or receive physical layer signals over one or more physical channels that may be received from and/or transmitted to the one or more radio networks. The PHY layer can further perform link adaptation or adaptive modulation and coding (AMC), power control, cell search (for example, initial synchronization and handover purposes), and other measurements used by higher layers, such as the RRC layer. The PHY layer can further perform error detection on one or more transport channels, forward error correction (FEC) coding/decoding of the one or more transport channels, modulation/demodulation of the one or more physical channels, interleaving, rate matching, mapping onto the one or more physical channels, and Multiple Input Multiple Output (MIMO) antenna processing. In some embodiments, the PHY layer can process requests from and provide indications to the MAC layer over one or more transport channels.

The 5G layer-2 can include a Medium Access Control (MAC) layer, a Radio Link Control (RLC) layer, and a Packet Data Convergence Protocol (PDCP) layer. The MAC layer processes requests from, and provides indications to, the RLC layer over one or more logical channels. The MAC layer can perform mapping between the one or more logical channels and the one or more transport channels, multiplexing of MAC Service Data Units (SDUs) from one or more logical channels onto Transport Blocks (TBs) to be delivered to the PHY layer via the one or more transport channels, de-multiplexing the MAC SDUs to one or more logical channels from TBs delivered from the PHY layer via the one or more transport channels, multiplexing the MAC SDUs onto TBs, scheduling information reporting, error correction through HARQ, and logical channel prioritization. The RLC layer processes requests from and provides indications to the PDCP layer over one or more RLC channels. The RLC 930 may operate in a plurality of modes of operation, including: Transparent Mode (TM), Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer processes requests from and provides indications to the RRC layer over one or more radio bearers. The PDCP layer may execute header compression and decompression of Internet Protocol (IP) data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations such as ciphering, deciphering, integrity protection, and/or integrity verification to provide some examples.

The 5G layer-3 can include the Radio Resource Control (RRC) layer. The RRC layer configures aspects of the 5G layer-1, the 5G layer-2, and/or the 5G layer-3. The RRC layer can include broadcast of system information, broadcast of system information related to the access stratum (AS), paging, establishment, maintenance and release of RRC connection between UEs and access nodes, for example, RRC connection paging, RRC connection establishment, RRC connection modification, and RRC connection release, establishment, configuration, maintenance and release of point to point Radio Bearers, security functions including key management, inter-RAT mobility, and measurement configuration for UE measurement reporting.

The antenna array 806 can include one or more antenna elements, each of which is capable of converting electrical signals into radio waves to travel through the air through communication beams, such as the communication beams 106.1 through 106.*m* and/or the communication beams 108.1 through 108.*n* as described above in FIG. 1. The one or more antenna elements can be omnidirectional, direction, or a combination thereof.

The memory subsystem 810 includes a number of memories including a main random-access memory (RAM), or other volatile storage device, for storage of instructions and data during program execution and/or a read only memory (ROM) in which instructions are stored. The memory subsystem 810 can provides persistent storage for program and data files, and may include a hard disk drive, a floppy disk drive along with associated removable media, a CD-ROM drive, an optical drive, a flash memory, or removable media cartridges. In the exemplary embodiment illustrated in FIG. 8, the memory subsystem 810 can optionally include an operating system 812 and an application 814. The operating system 812 can be Microsoft's Windows, Sun Microsystems's Solaris, Apple Computer's MacOs, Linux or UNIX to provide some examples. The computer system also typically can include a Basic Input/Output System (BIOS) and processor firmware. The operating system, the BIOS, and/or the firmware can be used by the processor circuitry 802 to control the PHY circuitry 804, the antenna array 806, the communication infrastructure 808, and/or the memory subsystem 810. In some embodiments, the operating system 812 maintains one or more network protocol stacks, such as an Internet Protocol (IP) stack, and/or a cellular protocol stack to provide some examples, that can include a number of logical layers. At corresponding layers of the protocol stack, the operating system 812 includes control mechanism and data structures to perform the functions associated with that layer. The application 814 can include applications, for example, used by the wireless system 800 and/or a user of wireless system 800. The applications in application 254 can include applications such as, but not limited to, Siri™, FaceTime™, radio streaming, video streaming, remote control, and/or other user applications which will be recognized by those skilled in the relevant art(s).

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An access node (AN) for scheduling transmission of a plurality of reference signals over a plurality of downlink communication beams, the AN comprising:
 a physical layer (PHY) circuitry configured to wirelessly communicate with a user equipment (UE); and
 a processor configured to:
  schedule a plurality of transmissions of the plurality of reference signals over the plurality of downlink communication beams,
  perform a Listen before talk (LBT) procedure to monitor a portion of a spectrum, the LBT procedure is to:
   identify a first channel occupancy time (COT) and a second COT where the portion of the spectrum is free from other transmissions,
  generate an indication of a LBT Failure where the portion of the spectrum is occupied by one or more other transmissions, transmit, using the PHY circuitry, a first transmission of the plurality of reference signals from among the plurality of transmissions over the plurality of downlink communication beams during the first COT,
ignore a second transmission of the plurality of reference signals from among the plurality of transmissions that is scheduled to be transmitted during the LBT Failure, and
transmit, using the PHY circuitry, a third transmission of the plurality of reference signals from among the plurality of transmissions over the plurality of downlink communication beams during the second COT.

2. The AN of claim 1, wherein the plurality of reference signals comprises a plurality of channel-state information reference signals (CSI-RSs).

3. The AN of claim 2, wherein the processor is configured to:
cause the PHY circuitry to transmit a first transmission of the plurality of CSI-RSs or of the plurality of CSI-RSs concurrently with a plurality of Physical Downlink Control Channels (PDCCHs) or a plurality of Physical Downlink Shared Channels (PDSCHs),
cause the PHY circuitry to ignore a second transmission of the plurality of CSI-RSs that is scheduled to be transmitted during the LBT Failure, and
cause the PHY circuitry to transmit a third transmission of the plurality of CSI-RSs or of the plurality of CSI-RSs concurrently with the plurality of PDCCHs or the plurality of PDSCHs.

4. The AN of claim 1, wherein the spectrum comprises an unlicensed spectrum having a frequency range above 52.6 Gigahertz (GHz).

5. The AN of claim 1, wherein the processor is configured to cause the PHY circuitry to transmit the third transmission of the plurality of reference signals over the plurality of downlink communication beams starting with an instance of a first reference signal from among the plurality of reference signals that is scheduled to be transmitted during the second COT.

6. The AN of claim 1, wherein the processor is configured to cause the PHY circuitry to transmit the third transmission of the plurality of reference signals over the plurality of downlink communication beams starting with an instance of the plurality of reference signals that is scheduled to be transmitted during the second COT.

7. The AN of claim 1, wherein the processor is configured to cause the PHY circuitry to transmit the third transmission of the plurality of reference signals over the plurality of downlink communication beams starting from a beginning of the second COT.

8. A method for scheduling transmission, the method comprising:
scheduling, by an access node (AN), a plurality of transmissions of a plurality of reference signals over a plurality of downlink communication beams;
performing, by the AN, a Listen before talk (LBT) procedure to monitor a portion of a spectrum, the LBT procedure comprising:
identifying a first channel occupancy time (COT) and a second COT where the portion of the spectrum is free from other transmissions,
generating an indication of a LBT Failure where the portion of the spectrum is occupied by one or more other transmissions;
transmitting, by the AN, a first transmission of the plurality of reference signals from among the plurality of transmissions over the plurality of downlink communication beams during the first COT;
ignoring, by the AN, a second transmission of the plurality of reference signals from among the plurality of transmissions that is scheduled to be transmitted during the LBT Failure; and
transmitting, by the AN, a third transmission of the plurality of reference signals from among the plurality of transmissions over the plurality of downlink communication beams during the second COT.

9. The method of claim 8, wherein the plurality of reference signals comprises a plurality of channel-state information reference signals (CSI-RSs).

10. The method of claim 9, wherein the transmitting the first transmission, the ignoring the second transmission, and the transmitting the third transmission comprises:
transmitting a first transmission of the plurality of CSI-RSs or of the plurality of CSI-RSs concurrently with a plurality of Physical Downlink Control Channels (PDCCHs) or a plurality of Physical Downlink Shared Channels (PDSCHs);
ignoring a second transmission of the plurality of CSI-RSs from among the plurality of transmissions of the plurality of CSI-RSs that is scheduled to be transmitted during the LBT Failure; and
transmitting a third transmission of the plurality of CSI-RSs or of the plurality of CSI-RSs concurrently with the plurality of PDCCHs or the plurality of PDSCHs.

11. The method of claim 8, wherein the spectrum comprises an unlicensed spectrum having a frequency range above 52.6 Gigahertz (GHz).

12. The method of claim 8, wherein the transmitting the third transmission comprises transmitting the third transmission of the plurality of reference signals over the plurality of downlink communication beams starting with an instance of a first reference signal from among the plurality of reference signals that is scheduled to be transmitted during the second COT.

13. The method of claim 8, wherein the transmitting the third transmission comprises transmitting the third transmission of the plurality of reference signals over the plurality of downlink communication beams starting with an instance of the plurality of reference signals that is scheduled to be transmitted during the second COT.

14. The method of claim 8, wherein the transmitting the third transmission comprises transmitting the third transmission of the plurality of reference signals over the plurality of downlink communication beams starting from a beginning of the second COT.

15. An access node (AN) for scheduling transmission of a plurality of reference signals over a plurality of downlink communication beams, the AN comprising:
a memory configured to store instructions; and
a processor configured to execute the instructions, the instructions, when executed by the processor, configuring the processor to:
schedule a plurality of transmissions of the plurality of reference signals over the plurality of downlink communication beams,
perform a Listen before talk (LBT) procedure to monitor a portion of a spectrum, the LBT procedure is to:
identify a first channel occupancy time (COT) and a second COT where the portion of the spectrum is free from other transmissions,
generate an indication of a LBT Failure where the portion of the spectrum is occupied by one or more other transmissions, transmit a first transmission of the plurality of reference signals from among the plurality of transmissions over the plurality of downlink communication beams during the first COT, ignore a second transmission of the plurality of reference signals from among the plurality of transmissions that is scheduled to be transmitted during the LBT Failure, and transmit a third transmission of the plurality of reference signals from among the plurality of transmissions over the plurality of downlink communication beams during the second COT.

16. The AN of claim 15, wherein the plurality of reference signals comprises a plurality of channel-state information reference signals (CSI-RSs).

17. The AN of claim 16, wherein the instructions, when executed by the processor, configure the processor to:

transmit a first transmission of the plurality of CSI-RSs or of the plurality of CSI-RSs concurrently with a plurality of Physical Downlink Control Channels (PDCCHs) or a plurality of Physical Downlink Shared Channels (PDSCHs), ignore a second transmission of the plurality of CSI-RSs that is scheduled to be transmitted during the LBT Failure, and transmit a third transmission of the plurality of CSI-RSs or of the plurality of CSI-RSs concurrently with the plurality of PDCCHs or the plurality of PDSCHs.

18. The AN of claim 15, wherein the spectrum comprises an unlicensed spectrum having a frequency range above 52.6 Gigahertz (GHz).

19. The AN of claim 15, wherein the instructions, when executed by the processor, configure the processor to transmit the third transmission of the plurality of reference signals over the plurality of downlink communication beams starting with an instance of a first reference signal from among the plurality of reference signals that is scheduled to be transmitted during the second COT.

20. The AN of claim 15, wherein the instructions, when executed by the processor, configure the processor to transmit the third transmission of the plurality of reference signals over the plurality of downlink communication beams starting with an instance of the plurality of reference signals that is scheduled to be transmitted during the second COT.

* * * * *